(12) United States Patent
Wolfram et al.

(10) Patent No.: US 11,526,332 B2
(45) Date of Patent: **\*Dec. 13, 2022**

(54) PROGRAMMING IN A PRECISE SYNTAX USING NATURAL LANGUAGE

(71) Applicant: Wolfram Alpha LLC, Champaign, IL (US)

(72) Inventors: Stephen Wolfram, Concord, MA (US); Theodore W. Gray, Champaign, IL (US)

(73) Assignee: Wolfram Alpha LLC, Champaign, IL (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/181,555

(22) Filed: Feb. 22, 2021

(65) Prior Publication Data

US 2021/0286596 A1 Sep. 16, 2021

Related U.S. Application Data

(63) Continuation of application No. 16/834,560, filed on Mar. 30, 2020, now Pat. No. 10,929,105, which is a continuation of application No. 16/370,336, filed on Mar. 29, 2019, now Pat. No. 10,606,563, which is a continuation of application No. 15/852,947, filed on Dec. 22, 2017, now Pat. No. 10,248,388, which is a continuation of application No. 13/678,168, filed on Nov. 15, 2012, now Pat. No. 9,851,950.

(60) Provisional application No. 61/560,163, filed on Nov. 15, 2011.

(51) Int. Cl.
*G06F 8/30* (2018.01)
*G06F 40/40* (2020.01)

(52) U.S. Cl.
CPC ............... *G06F 8/30* (2013.01); *G06F 40/40* (2020.01)

(58) Field of Classification Search
CPC .................................. G06F 8/30; G06F 40/40
See application file for complete search history.

(56) References Cited

U.S. PATENT DOCUMENTS

| | | | |
|---|---|---|---|
| 9,081,761 B1 * | 7/2015 | Little | G06F 3/0237 |
| 10,929,105 B2 | 2/2021 | Wolfram et al. | |
| 2005/0166182 A1 * | 7/2005 | Wang | G06F 40/30 |
| | | | 717/114 |

(Continued)

OTHER PUBLICATIONS

Lee, Beum-Seuk, and Barrett R. Bryant. "Automation of software system development using natural language processing and two-level grammar." International Workshop on Radical Innovations of Software and Systems Engineering in the Future. Springer, Berlin, Heidelberg, 2002. (Year: 2002).*

(Continued)

*Primary Examiner* — S. Sough
*Assistant Examiner* — Joanne G Macasiano
(74) *Attorney, Agent, or Firm* — Lempia Summerfield Katz LLC

(57) ABSTRACT

A method facilitates development of instructions in a precise syntax, such as built-in functions of a computational system such as a spreadsheet application, using natural language (NL) input. A user may enter NL input in a workspace. An NL processing system may process the NL input to generate instruction(s) in a precise syntax that corresponds to the NL input. The instruction(s) in the precise syntax then may be included in the workspace.

21 Claims, 13 Drawing Sheets

(56) References Cited

U.S. PATENT DOCUMENTS

2008/0066052 A1* 3/2008 Wolfram .................. G06F 3/01
  717/109

OTHER PUBLICATIONS

McMillan, Collin, Denys Poshyvanyk, and Mark Grechanik. "Recommending source code examples via api call usages and documentation." Proceedings of the 2nd International Workshop on Recommendation Systems for Software Engineering. 2010. (Year: 2010).*

* cited by examiner

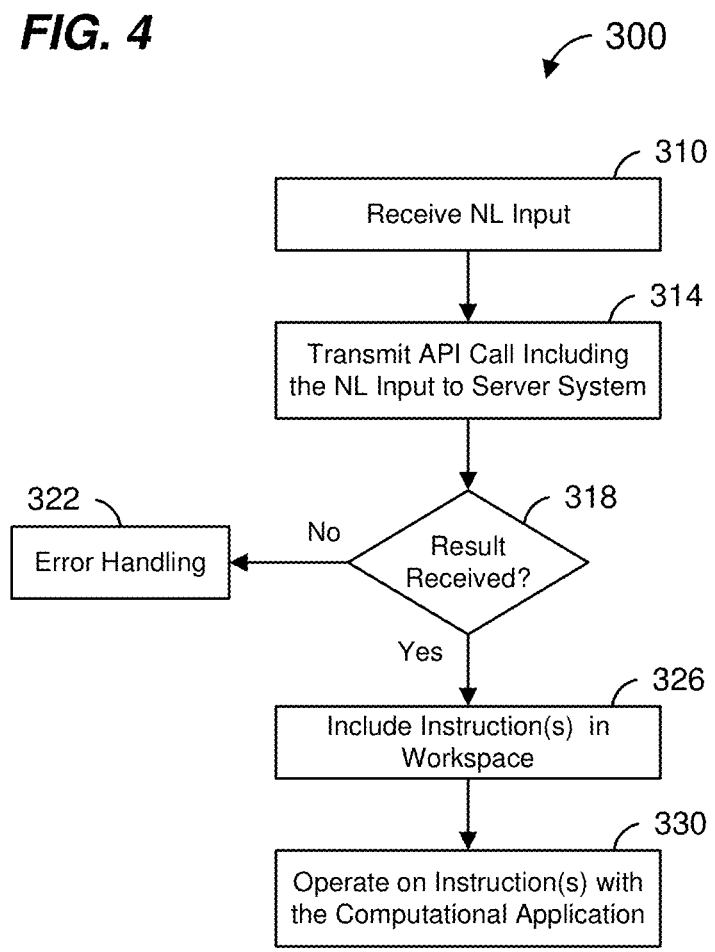

FIG. 8A

In[1]: = ▪ average of 12, 2,6, 23, 102, 34
                ↑562      ↑558

↙570
                    ↙562    ↓558
In[1]: = ▪ ┌─────────────────────────────┐ ← 590
           │ average of 12, 2,6, 23, 102, 34  + │
           ├─────────────────────────────┤
           │ Mean[{12, 2.6, 23, 102, 34}]      │
           └─────────────────────────────┘
                            ↑574

Out[1]: = 34.72
         ↗      ↖
       586     582

In[1]: = ▮ limit representations of Euler gamma  ← 610

Out[1]: = True
         ↑
         640

FIG. 10A

In[1]:= Series[ ▪ gamma function, {x, 0, 1}]
         ↑         ↑              ↑
        650       664            668
                  660            672

FIG. 10B

In[1]:= Series[ ▪ ┌─ gamma function ▼ ─┐ , {x, 0, 1}]
                  │  ─────────────     │
                  │    Gamma[x]     ▲  │
                  └────────────────────┘
         660          684
                            680, 692, 690

Out[1]:= $\frac{1}{x} - \text{EulerGamma} + \frac{1}{12}\left(6\text{EulerGamma}^2 + \pi^2\right)x + o[x]^2$
                                ↑
                               686

FIG. 10C

In[1]:= Series[ ▪ ( gamma function ♦ ) , {x, 0, 1}]
                        ↑
                       664
                   680, 694

FIG. 10D

In[1]:= Series[ ▪ ( Gamma[x] ♦ ) , {x, 0, 1}]
                       ↑
                      684
                  680, 696

FIG. 10E

In[1]:= Series[Gamma[x], {x, 0, 1}]
              660

FIG. 11
In[7]:= = ┌─ 710
Plot sin x in dark brown with light orange filling »
↳ Result
Show[Plot[Sin[x], {x, -6.6, 6.6}, ← 720
 PlotStyle -> Darker[Brown],
 {Filling -> Axis,
  FillingStyle -> Lighter[Orange]}]]
Out[7]:= 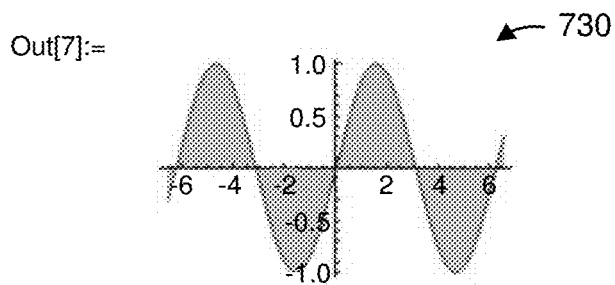 ← 730
In[8]:= = ┌─ 740
add red dashed grid lines »
↳ Input interpretation
Show[%, Gridlines -> Automatic, ← 750
 GridLinesStyle -> Directive[Red, Dashed]]
Out[8]:= 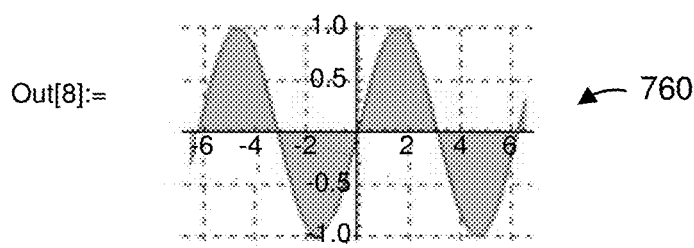 ← 760

FIG. 12A
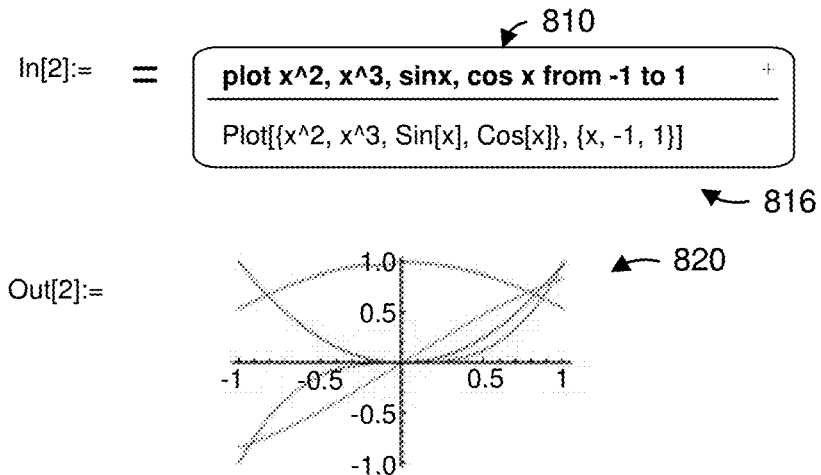
FIG. 12B
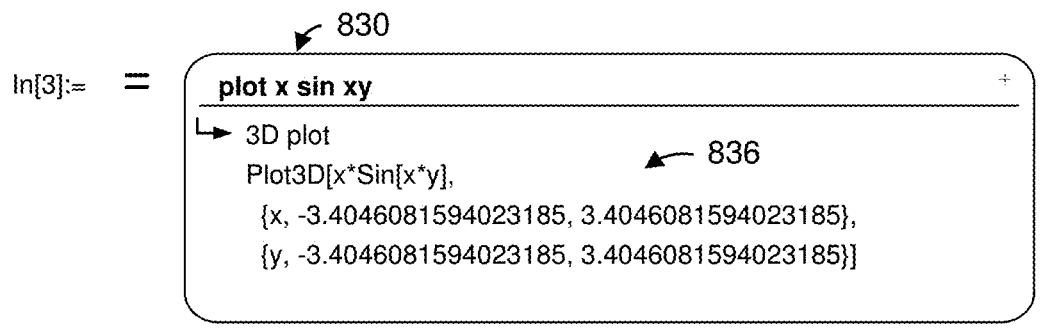
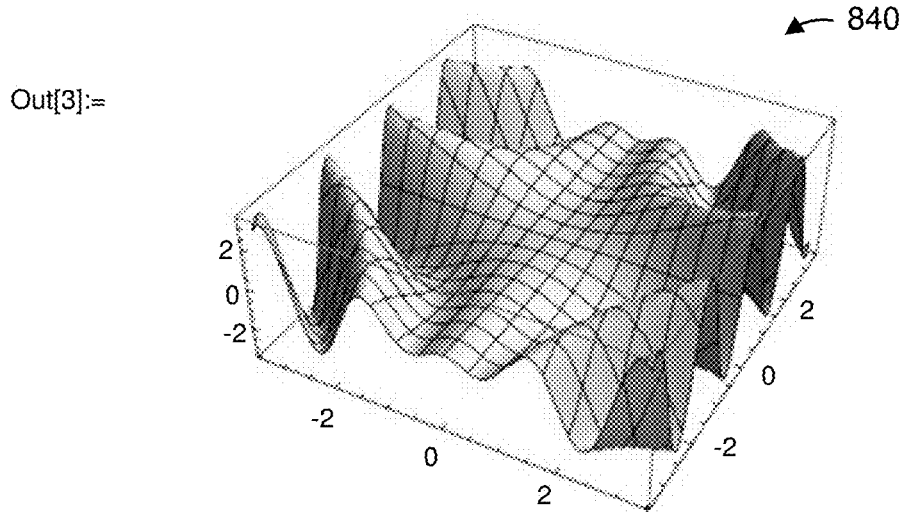

PROGRAMMING IN A PRECISE SYNTAX USING NATURAL LANGUAGE

CROSS-REFERENCE TO RELATED APPLICATION

This application is a continuation of U.S. patent application Ser. No. 16/834,560 (now U.S. Pat. No. 10,929,105) entitled, "Programming in a Precise Syntax Using a Natural Language," filed on Mar. 30, 2020, which is a continuation of U.S. patent application Ser. No. 16/370,336 (now U.S. Pat. No. 10,606,563), entitled "Programming in a Precise Syntax Using Natural Language," filed on Mar. 29, 2019, which is a continuation of U.S. patent application Ser. No. 15/852,947 (now U.S. Pat. No. 10,248,388), entitled "Programming in a Precise Syntax Using Natural Language," filed on Dec. 22, 2017, which is a continuation of U.S. patent application Ser. No. 13/678,168 (now U.S. Pat. No. 9,851,950), entitled "Programming in a Precise Syntax Using Natural Language," filed on Nov. 15, 2012, which claims the benefit of U.S. Provisional Application No. 61/560,163, entitled "Programming in a Precise Syntax Using Natural Language," filed on Nov. 15, 2011. All of the applications referenced above are hereby incorporated by reference herein in their entireties.

FIELD OF THE DISCLOSURE

The present disclosure generally relates to systems that enable generation of instructions in a precise syntax, such as software source code or built-in functions of a computational system, using natural language input.

BACKGROUND

Software programming source code must be written in a precise syntax so that the compiler or interpreter can correctly convert the source code to machine code. When there are errors in the syntax of the source code, the compiler/interpreter cannot convert the source code to machine code, or converts the source code in a manner that was not intended by the author of the source code. For a novice, learning the correct syntax of a software programming language is burdensome and time consuming. Even for an experienced programmer, learning the correct syntax for a function of which the programmer is not yet familiar is time consuming. For example, the programmer may need to consult a reference (e.g., a textbook) to find a suitable function and then learn the correct syntax for using the function.

Some programming systems provide a graphical user interface to permit a user to create a program. For example, a user can create a program by spatially arranging and connecting boxes with arrows, and associating textual expressions with the boxes. The textual expressions are in a precise context and define the actions to be taken upon input to a box.

This disclosure will refer to example implementations in the context of the MATHEMATICA® computational system available from Wolfram Research, Inc. The methods and system described herein are more general and could be implemented in a variety of environments such as in other computational systems and in software development systems (e.g., source code development systems).

MATHEMATICA® is a powerful computational tool that can evaluate general symbolic expressions, as well as mathematical and numeric expressions. A unifying feature of MATHEMATICA® is that everything is internally represented as a symbolic expression, with all more specific data types treated as special cases—symbols to which additional rules apply. MATHEMATICA® is an interpreted language, with a notion of "evaluation" of symbolic expressions. Evaluation consists in applying to any symbolic expression all transformation rules that fit that expression.

In the MATHEMATICA® software system, a user can create interactive electronic documents referred to as "notebooks." Various expressions, including numeric and symbolic expressions, can be entered into a notebook via a keyboard, for example, and a user can cause the expression to be evaluated. As a simple example, a user could set a variable x to the numeric value 5 by typing "x=5" into the notebook and then pressing "ENTER" while holding down the "SHIFT" key. This is shorthand for the expression Set[x, 5], calling the built in function "Set".

In response, the MATHEMATICA® software system conceptually sets the abstract variable x to the value 5. The symbolic expression "x" can, when evaluated, be replaced by the symbol 5. This is one technique by which an interpreted symbolic language may implement variables and variable assignments.

Next, the user could type in an expression x2 by typing "x^2" into the notebook. To evaluate this expression, the user could then press "Enter" while holding down the "Shift" key. In response, the MATHEMATICA® software system evaluates x2 based on the current value of x (set by the user to 5) and would then display "25" in the notebook. To have the notebook display the value of x2 for a different value of x, the user could first type into the notebook the new value of x. For example, the user could type "x=7" into the notebook and then pressing "Shift" and "Enter". In response, the MATHEMATICA® software system resets the variable x to the value 7. Next, the user could retype "x^2" into the notebook and then press "Shift" and "Enter". Alternatively, instead of retyping "x^2" into the notebook, the user could place a cursor on or next to the previously entered expression "x^2" and then press "Shift" and "Enter". In response, the MATHEMATICA® software system evaluates x2 based on the new value of x (set by the user to 7) and would then display "49" in the notebook.

If no value has been assigned to a symbol, evaluation will return the symbol itself unchanged. Thus if a user types x^2, holds "shift" and "enter", without any previous "Set" operation, the MATHEMATICA® software system will return x2. The system knows various rules to apply to compound symbolic expressions (through functions like "Expand" or "Simplify", for example), whether their component sub-expressions have "Set" values or not.

Spreadsheet software applications, such as the EXCEL® software application available from Microsoft Corporation, permit a user to create spreadsheets comprising grids of cells. In a spreadsheet, a value in one cell may be dependent upon a value in one or more other cells. For example, a user may assign a formula to a first cell that uses a value from a second cell. Then, the spreadsheet application will calculate an output of the formula using the value from the second cell, and will display the calculated value in the first cell. Such applications require inputs to the first cell in a numeric form, need an explicit formula taking numeric input to relate the contents of the second cell to the numeric values in the first, and output numeric output to the second cell.

SUMMARY OF THE DISCLOSURE

Methods and systems disclosed herein facilitate development of instructions in a precise syntax, such as software source code or built-in functions of a computational system (e.g., a spreadsheet application), using natural language (NL) input. A user may enter NL input in a workspace. An NL processing system may process the NL input to generate instruction(s) in a precise syntax that corresponds to the NL input. The instruction(s) in the precise syntax then may be included in the workspace.

In an embodiment, a method includes: receiving, via a user interface device, user input for inclusion in a workspace document, wherein the workspace document is displayed in a graphical user interface of a software development application that, when executed by one or more computer processors, is configured to evaluate instructions in a precise syntax; after receiving the user input, displaying, on a display device, the user input in the workspace document; determining, at the one or more computer processors, whether at least a portion of the user input i) is in the precise syntax, or ii) is in an imprecise syntax; and when it is determined that at least the portion of the user input is in the precise syntax, evaluating, at the one or more computer processors, at least the portion of the user input according to the precise syntax. The method also includes, when it is determined that at least the portion of the user input is in the imprecise syntax: generating, at the one or more computer processors, an application programming interface (API) call that includes i) the at least the portion of the user input in the imprecise syntax, and ii) information indicating a result of a previous evaluation, by the software development application, of a user input previously entered into the workspace document, sending, by the one or more computer processors, the API call to a natural language processing (NLP) system implemented by one or more computer processors, processing, at the NLP system, the API call to determine the instruction in the precise syntax that corresponds to the user input in the imprecise syntax, wherein the instruction in the precise syntax is for generating a modification of the result of the previous evaluation, formatting, at the NLP system, the instruction in the precise syntax according to a format recognized by the software development application, receiving, at the one or more computer processors, the instruction in the precise syntax from the NLP system, wherein receiving the instruction in the precise syntax from the NLP system is responsive to sending the API call to the NLP system, including, by one or more computer processors, the instruction in the precise syntax in the workspace document such that the software development application executed by one or more computer processors can evaluate the instruction in the precise syntax, and after including the instruction in the precise syntax in the workspace document, evaluating, at one or more computing devices, the instruction in the precise syntax.

In another embodiment, one or more tangible, non-transitory computer readable storage media storing machine readable instructions that, when executed by one or more computer processors, cause the one or more processors to: receive, via a user interface device, user input for inclusion in a workspace document, wherein the workspace document is displayed in a graphical user interface of a software development application that, when executed by one or more computer processors, is configured to evaluate instructions in a precise syntax; after receiving the user input, display, on a display device, the user input in the workspace document; determine whether at least a portion of the user input i) is in the precise syntax, or ii) is in an imprecise syntax; and when it is determined that at least the portion of the user input is in the precise syntax, evaluate at least the portion of the user input according to the precise syntax. The one or more tangible, non-transitory computer readable storage media also store machine readable instructions that, when executed by one or more computer processors, cause the one or more processors to: when it is determined that at least the portion of the user input is in the imprecise syntax, generate an application programming interface (API) call that includes i) the at least the portion of the user input in the imprecise syntax, and ii) information indicating a result of a previous evaluation, by the software development application, of a user input previously entered into the workspace document, send the API call to a natural language processing (NLP) system implemented by the one or more computer processors, process, at the NLP system, the API call to determine the instruction in the precise syntax that corresponds to the user input in the imprecise syntax, wherein the instruction in the precise syntax is for generating a modification of the result of the previous evaluation, format, at the NLP system, the instruction in the precise syntax according to a format recognized by the spreadsheet application, receive the instruction in the precise syntax from the NLP system, wherein receiving the instruction in the precise syntax from the NLP system is responsive to sending the API call to the NLP system, include the instruction in the precise syntax in the workspace document such that the spreadsheet application executed by one or more computer processors can evaluate the instruction in the precise syntax, and after including the instruction in the precise syntax in the workspace document, evaluate the instruction in the precise syntax.

In yet another embodiment, a system, comprises: one or more computer processors; and one or more tangible, non-transitory computer readable storage media that store machine readable instructions that, when executed by one or more computer processors, cause the one or more processors to: receive, via a user interface device, user input for inclusion in a workspace document, wherein the workspace document is displayed in a graphical user interface of a software development application that, when executed by one or more computer processors, is configured to evaluate instructions in a precise syntax; after receiving the user input, display, on a display device, the user input in the workspace document; determine whether at least a portion of the user input i) is in the precise syntax, or ii) is in an imprecise syntax; and when it is determined that at least the portion of the user input is in the precise syntax, evaluate at least the portion of the user input according to the precise syntax. The one or more tangible, non-transitory computer readable storage media also store machine readable instructions that, when executed by one or more computer processors, cause the one or more processors to: when it is determined that at least the portion of the user input is in the imprecise syntax, generate an application programming interface (API) call that includes i) the at least the portion of the user input in the imprecise syntax, and ii) information indicating a result of a previous evaluation, by the software development application, of a user input previously entered into the workspace document, send the API call to a natural language processing (NLP) system implemented by the one or more computer processors, process, at the NLP system, the API call to determine the instruction in the precise syntax that corresponds to the user input in the imprecise syntax, wherein the instruction in the precise syntax is for generating a modification of the result of the previous evaluation, format, at the NLP system, the instruction in the precise syntax according to a format recognized by the spreadsheet application, receive the instruction in the precise syntax from the NLP system, wherein receiving the instruction in the precise syntax from the NLP system is responsive to sending the API call to the NLP system, include the instruction in the precise syntax in the workspace document such that the spreadsheet application executed by one or more computer processors can evaluate the instruction in the precise syntax, and after including the instruction in the precise syntax in the workspace document, evaluate the instruction in the precise syntax.

BRIEF DESCRIPTION OF THE DRAWINGS

FIG. 4 is a flow diagram of another example method for assisting with the development of instruction(s) in a precise syntax in a system such as the system of FIG. 1, in an embodiment.

FIGS. 8A and 8B illustrate another example of display information utilized when entering NL input into a workspace of a computational application, and then including corresponding instructions in a precise format in the workspace, according to an embodiment.

FIGS. 10A-10E illustrate another example of display information utilized when entering NL input into a workspace of a computational application, and then including corresponding instructions in a precise format in the workspace, according to an embodiment.

FIG. 11 illustrates another example of display information utilized when entering NL input into a workspace of a computational application, and then including corresponding instructions in a precise format in the workspace, according to an embodiment.

FIGS. 12A and 12B illustrate another example of display information utilized when entering NL input into a workspace of a computational application, and then including corresponding instructions in a precise format in the workspace, according to an embodiment.

DETAILED DESCRIPTION

Figure 1:
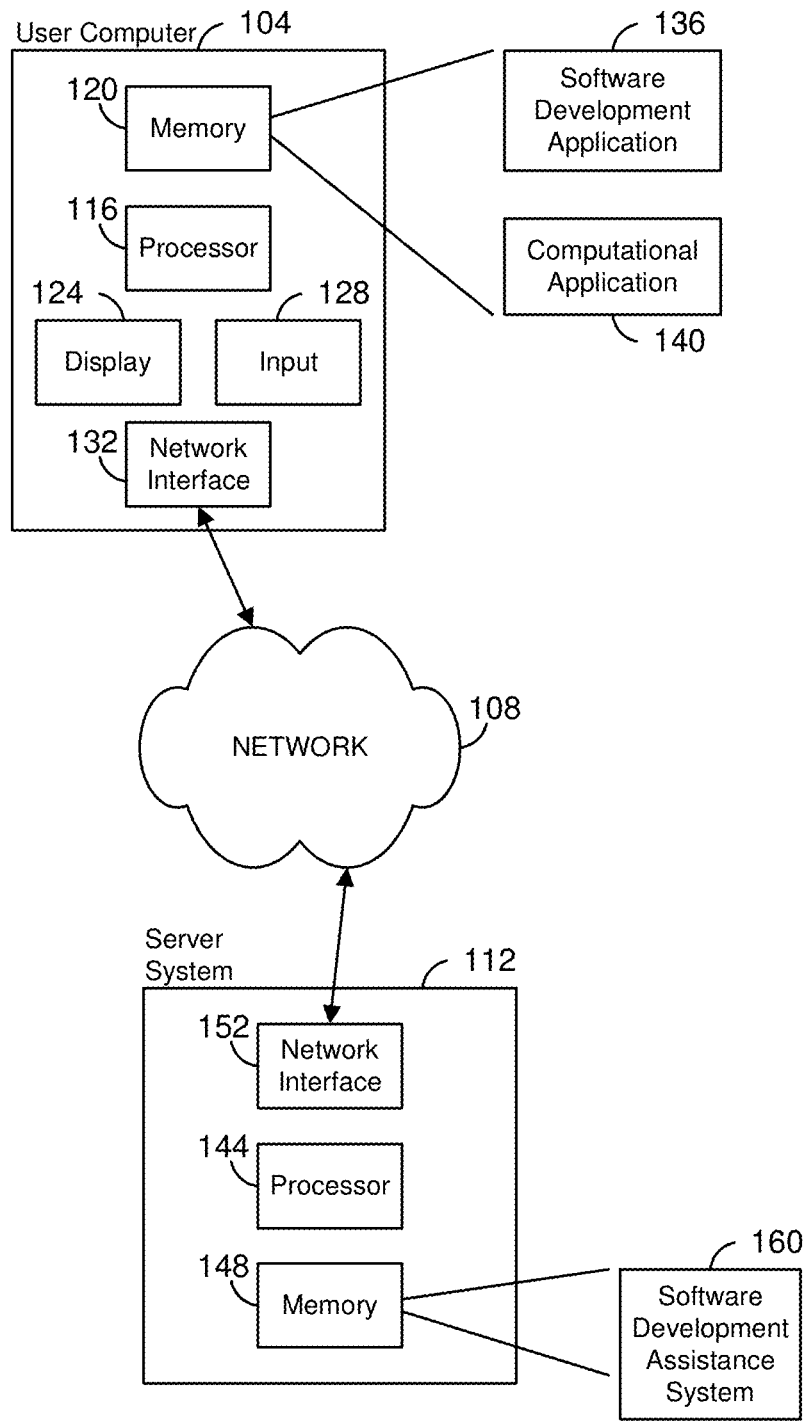
FIG. 1 is a diagram of an example system 100 in which a user can utilize natural language (NL) to create a software program in a precise syntax and/or utilize a computational application that is configured to execute instructions, functions, commands, formulas, etc., in a precise syntax, according to an embodiment.

FIG. 1 is a diagram of an example system 100 in which a user can utilize natural language (NL) to create a software program in a precise syntax and/or utilize a computational application that is configured to execute instructions, functions, commands, formulas, etc., in a precise syntax, according to an embodiment.

A user computer 104 is communicatively coupled to a communication network 108 such as the Internet, an intranet, an extranet, etc. A server system 112 is also communicatively coupled to the network 108. The user computer 104 is configured to facilitate software development and/or to implement a computational application such as the MATHEMATICA® computational application from Wolfram Research, Inc., a spreadsheet application, etc. The user computer 104 is also configured to communicate with the server system 112 via the network 108. In particular, the user computer 104 may be configured to transmit electronically to the server system 112, via the network 108, NL user input that is indicative of one or more of an instruction, a function, a command, etc., a set of instructions/functions/commands etc., a set of software instructions, etc., in a precise syntax. The server system 112 may be configured to analyze the NL user input from the user computer 104 and to determine an instruction, a function, a command, etc., a set of instructions/functions/commands etc., a set of software instructions, etc., in a precise syntax that corresponds to the NL user input. The server system 112 may be configured to transmit electronically to the user computer 104, via the network 108, the determined instruction, function, command, etc., set of instructions/functions/commands etc., set of software instructions, etc.

The user computer 104 may be a computing device such as a desktop computer, a gaming system, a tablet computer, a smart phone, etc. The user computer 104 may include one or more processors 116, one more memory devices 120 (e.g., random access memory (RAM), read only memory (ROM), FLASH memory, a magnetic disk, an optical disk, etc.), one or more display devices 124 (e.g., integral display device and/or external display device), and one or more input devices, such as a keyboard, a keypad, a button, a mouse, a trackball, a touch screen, a multi-touch screen, a touch pad, etc. The user computer 104 may include a network interface 132 to communicatively couple the user computer 104 to the network 108. At least some of the one or more processors 116, the one or more memory devices 120, the one or more display devices 124, the one or more input devices 128, and the network interface 132 may be communicatively coupled together via one or more busses (not shown), cords (not shown), etc.

The one or more memory devices may store a software development application 136 and/or a computational application 140. The software development application 136, when executed by the one or more processors 120, may enable a user to develop a software program. For example, the software development application 136 may include a source code editor (not shown). The software development application 136 may be configured to enable, when the software development application 136 is executed by the one or more processors 120, a user to enter a NL user input that is indicative of one or more of a software instruction, function, etc., a set of software instructions/functions etc., and to forward the NL user input to the server system 112. Additionally, the software development application 136 may be configured to incorporate into the software program being developed by the user, when the software development application 136 is executed by the one or more processors 120, a software instruction, function, etc., a set of software instructions/functions etc., received from the server system 112.

The computational application 140, when executed by the one or more processors 120, may perform numerical, graphical, and/or symbolic calculations corresponding to functions, commands, instructions, formulas, etc., in a precise syntax, entered by the user in an electronic worksheet, spreadsheet, workbook, etc. For example, the computational application 140 may execute or interpret the entered functions, commands, instructions, formulas, etc., and perform corresponding numerical and/or symbolic calculations to generate corresponding results, which the computational application 140 may display in the electronic worksheet, spreadsheet, workbook, etc. The computational application 140 may be configured to enable, when the computational application 140 is executed by the one or more processors 120, a user to enter a NL user input that is indicative of one or more of a function, command, instruction, formula, etc., a set of functions, commands, instructions, formulas, etc., and to forward the NL user input to the server system 112. Additionally, the computational application 140 may be configured to incorporate into the electronic worksheet, spreadsheet, workbook, etc., being developed by the user, when the computational application 140 is executed by the one or more processors 120, a function, command, instruction, formula, etc., a set of functions/commands/instructions/formulas, etc., received from the server system 112.

For brevity, the terms "instruction in a precise syntax" and "instructions in a precise syntax" will be used to refer software code, instruction(s), function(s), etc., in a precise syntax, and/or function(s), command(s), instruction(s), formula(s), etc., in a precise syntax that are capable of being executed and/or interpreted by a computational application.

The server system 112 may comprise one or more computing devices such as a desktop computer, a server, a mainframe, etc. The server system 112 may include one or more processors 144, one more memory devices 148 (e.g., RAM, ROM, FLASH memory, a magnetic disk, an optical disk, a database system, etc.), and a network interface 152 to communicatively couple the server system 112 to the network 108. At least some of the one or more processors 144, the one or more memory devices 148, and the network interface 152 may be communicatively coupled together via one or more of 1) one or more busses, 2) one or more networks (e.g., a local area network (LAN), a wide area network (WAN), etc.) 3) point-to-point communication links, 4) cords, etc. (not shown).

The one or more memory devices 148 may store a software development assistance system application 160. The software development assistance system application 160, when executed by the one or more processors 144, may assist a user in using the software development application 136 and/or the computational application 140. For example, the software development assistance system application 160, when executed by the one or more processors 144, may receive from the user computer 104 NL user input that is indicative of instruction(s) in a precise syntax. Additionally, the software development assistance system application 160, when executed by the one or more processors 144, may determine instruction(s) in a precise syntax that correspond to the NL user input. Additionally, the software development assistance system application 160, when executed by the one or more processors 144, may cause the determined instruction(s) in the precise syntax to be transmitted to the user computer 104 via the network 108.

Figure 2:
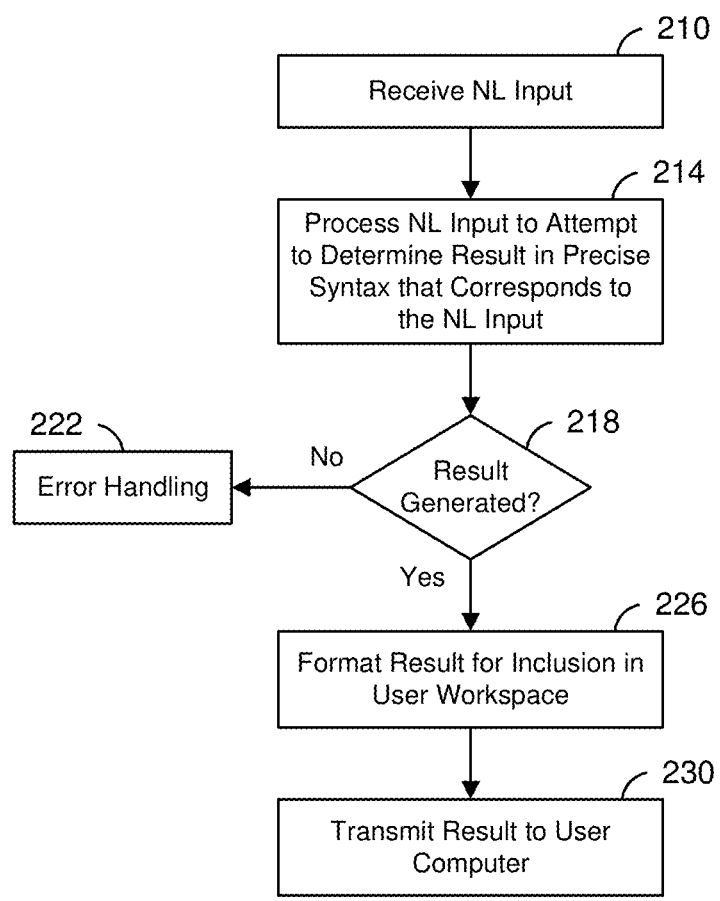
FIG. 2 is a flow diagram of an example method for assisting with the development of instruction(s) in a precise syntax in a system such as the system of FIG. 1, in an embodiment.

FIG. 2 is a flow diagram of an example method 200 for assisting with the development of instruction(s) in a precise syntax in a system such as the system 100 of FIG. 1 or in another suitable system, in an embodiment. For example, the software development assistance system application 160, when executed by the one or more processors 144, may implement the method 200. The method 200 of FIG. 2 will be discussed with reference to the system 100 of FIG. 1 for ease of explanation, but the method 200 may be implemented in a suitable system other than the system 100 of FIG. 1.

At block 210, NL input corresponding to instruction(s) in a precise syntax is electronically received. For example, as discussed above, the user may enter the NL input via the software development application 136 or the computational application 140 executed by the user computer 104. The user computer 104 may then electronically transmit the NL input via the network 108 to the server system 112. The server system 112 thus may electronically receive the NL input. In an embodiment, the NL input may be received as an application programming interface (API) call to the software development assistance system application 160.

At block 214, an NL processing (NLP) system may process the NL input in an attempt to determine a result (i.e., instruction(s) in a precise syntax) that corresponds to the NL input. For instance, the software development assistance system application 160 may include an NLP system that, when executed by the one or more processors 144, may utilize suitable NLP techniques to attempt to determine instruction(s) in a precise syntax that correspond to the NL input.

At block 218, it may be determined whether a result (an i.e., instruction(s) in a precise syntax) were generated at block 214. If is determined that a result was not generated at block 214, the flow may proceed to block 222. At block 222, suitable error handling may be performed. For example, a message may be electronically to the user computer 104 to indicate that the server system 112 was unable to generate a result in response to the NL input.

If at block 218 it is determined that a result was generated at block 214, the flow may proceed to block 226. At block 226, the result may be formatted for inclusion in a workspace being utilized by the user for software development or development of instructions, commands, functions, formulas, etc., for processing by the computational application 140. For example, the result may be formatted for inclusion in a workspace of the software development application 136 or of the computational application 140. For example, the result may be formatted as text, XML, formatted according to a format recognized by the software development application 136, formatted according to a format recognized by the computational application 140, etc.

At block 230, the result may be electronically transmitted to the user computer. For example, as discussed above, the server system 112 may electronically transmit the result via the network 108 to the user computer 104.

Figure 3:
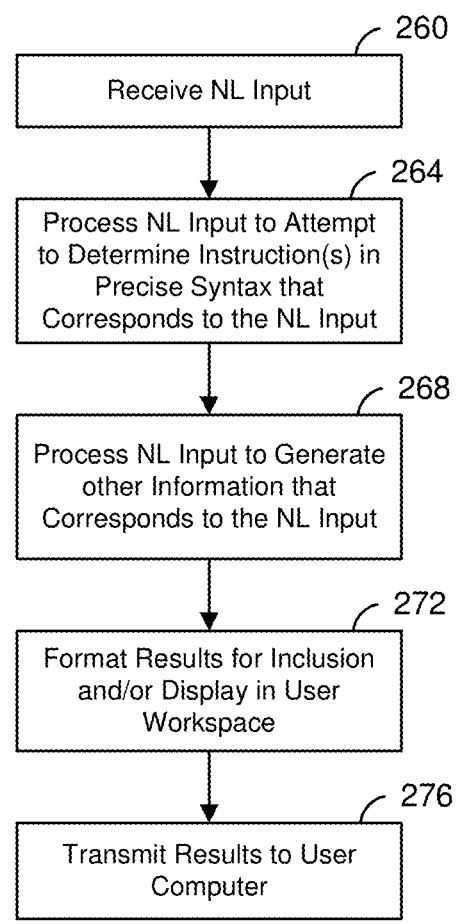
FIG. 3 is a flow diagram of another example method for assisting with the development of instruction(s) in a precise syntax in a system such as the system of FIG. 1, in an embodiment.

FIG. 3 is a flow diagram of an example method 250 for assisting with the development of instruction(s) in a precise syntax in a system such as the system 100 of FIG. 1 or in another suitable system, in an embodiment. For example, the software development assistance system application 160, when executed by the one or more processors 144, may implement the method 250. The method 250 of FIG. 3 will be discussed with reference to the system 100 of FIG. 1 for ease of explanation, but the method 250 may be implemented in a suitable system other than the system 100 of FIG. 1.

At block 260, NL input corresponding to instruction(s) in a precise syntax is electronically received. For example, as discussed above, the user may enter the NL input via the software development application 136 or the computational application 140 executed by the user computer 104. The user computer 104 may then electronically transmit the NL input via the network 108 to the server system 112. The server system 112 thus may electronically receive the NL input. In an embodiment, the NL input may be received as an API call to the software development assistance system application 160.

At block 264, an NLP system may process the NL input in an attempt to determine one or more results (i.e., instruction(s) in a precise syntax) that corresponds to the NL input. For instance, the software development assistance system application 160 may include an NLP system that, when executed by the one or more processors 144, may utilize suitable NLP techniques to attempt to determine instruction(s) in a precise syntax that correspond to the NL input. In many instances, the NLP system may generate multiple results that correspond to the NL input. When the NLP system generates multiple results that correspond to the NL input, the NLP system may select a subset of the results in at least some situations. For example, when the number of results exceeds a threshold, the NLP system may select a subset of the results such that the subset does not exceed the threshold. The NLP system may be configured to rank results when multiple results are generated. Additionally or alternatively, the NLP system may be configured to indicate one of the results as a primary result when multiple results are generated.

At block 268, the NLP system may process the NL input to generate other information based on the NL input and/or instruction(s) in the precise syntax generated at block 264. The other information generated at block 268 may or may not include instruction(s) in a precise syntax. For instance, if the NLP system is able to determine instruction(s) in a precise syntax at block 264, the NLP system may generate information associated with the instruction(s) in the precise syntax generated at block 264. For example, if instruction(s) in the precise syntax generated at block 264 include instruction(s) that correspond to a function y with respect to a variable x, the NLP system may generate a plot of y versus x. As another example, the NLP system may determine a derivative of y with respect to x. As another example, the NLP system may determine an integral of y over x. As another example, if instruction(s) in the precise syntax generated at block 264 correspond to sorting a set of values from lowest to highest, the NLP system may generate instruction(s) in the precise syntax that correspond to sorting the set of values from highest to lowest.

Additionally, the NLP system may generate information that corresponds to only a portion of the NL input. For instance, the NLP system may attempt to determine instruction(s) in a precise syntax that corresponds to only a portion of the NL input. As another example, the NLP system may generate information that is not instruction(s) in a precise syntax. For instance, if the portion of the NL input is the text "sin x," the NLP system may generate information related to the trigonometric function sin(x), such as a plot of the trigonometric function sin(x), sin(x) expressed as the mathematical constant e, the derivative of sin(x), the integral of sin(x), etc.

Thus, in some embodiments, generating the other information based on the NL input may include determining a mathematical expression that corresponds to at least a portion of the NL input and determining information mathematically, statistically, or scientifically related to the mathematical expression.

At block 272, results generated at block 264 and/or block 268 may be formatted for inclusion or display in a workspace being utilized by the user for software development or development of instructions, commands, functions, formulas, etc., for processing by the computational application 140. For example, results that are instruction(s) in a precise syntax may be formatted for inclusion in a workspace of the software development application 136 or of the computational application 140. For example, the result may be formatted as text, XML, formatted according to a format recognized by the software development application, formatted according to a format recognized by the computational application, etc. Results that are not instruction in a precise syntax may be formatted for display in a workspace of the software development application 136 or of the computational application 140. For example, the result may be formatted as text, XML, HTML, image data (e.g., JPEG, TIFF, etc.), formatted according to a format recognized by the software development application 136, formatted according to a format recognized by the computational application 140, etc.

If the results have been ranked by the NLP system, block 272 may include utilizing the rank information and/or rank information may be included in the formatted results. Similarly, if one of the results is marked by the NLP system as a primary result, block 272 may include utilizing such information and/or such information may be included in the formatted results. For example, rank information and/or primary result information may be utilized to order the results in the formatted results and/or to select a first result in a list of results in the formatted results.

At block 276, the result may be electronically transmitted to the user computer. For example, as discussed above, the server system 112 may electronically transmit the result via the network 108 to the user computer 104.

In an embodiment, the software development assistance system application 160, when executed by the one or more processors 144, may implement both the method 200 and the method 250. For example, the method 200 may be invoked by a first API call and the method 250 may be invoked by a second API call. In other embodiments, the software development assistance system application 160, when executed by the one or more processors 144, may implement one of the method 200 and the method 250.

FIG. 4 is a flow diagram of an example method 300 for assisting with the development of instruction(s) in a precise syntax in a system such as the system 100 of FIG. 1 or in another suitable system, in an embodiment. For example, the software development application 136 or the computational application 140, when executed by the one or more processors 116, may implement the method 300. The method 300 of FIG. 4 will be discussed with reference to the system 100 of FIG. 1 for ease of explanation, but the method 300 may be implemented in a suitable system other than the system 100 of FIG. 1.

At block 310, NL input corresponding to instruction(s) in a precise syntax is electronically received. For example, as discussed above, the user may enter the NL input via a keyboard, a touch screen, a voice recognition system, etc., of the user computer 104. The NL input may then be electronically received by the software development application 136 or the computational application 140.

At block 314, an API call that includes the NL input is generated and electronically transmitted to the server system 112. For example, the user computer 104 may generate the API call that includes the NL input, and then electronically transmit the API call via the network 108 to the server system 112. For instance, the software development application 136 or the computational application 140, when executed by the one or more processors 116, may generate the API call and cause the API call to be transmitted.

At block 318, it may be determined if a result was received from the server system 112 in response to the API call transmitted at block 314. If is determined that a result was not received, the flow may proceed to block 322. For example, if a message from the server system 112 indicates that the server system 112 was not able to generate instruction(s) in a precise syntax in response to the API call transmitted at block 314, the flow may proceed to block 322. At block 222, suitable error handling may be performed. For example, a message may be presented to the user by the user computer 104 to indicate that the server system 112 was unable to generate instruction(s) in a precise syntax in response to the NL input. The message may be displayed on the display device 124, generated as an audio signal using an audio output device of the user computer 104.

If at block 318 it is determined that a result (i.e., instruction(s) in the precise syntax) was received, the flow may proceed to block 326. At block 326, the instruction(s) in the precise syntax may be included in a workspace being utilized by the user for software development or development of instructions, commands, functions, formulas, etc., for processing by the computational application 140. In one embodiment, the instruction(s) in the precise syntax may be included in a workspace automatically without any further user input. In another embodiment, the user may be prompted (e.g., via the display device 124 and/or an audio output device of the user computer 104) whether to include the instruction(s) in the precise syntax in the workspace. For example, a window may display to the user the instruction(s) in the precise syntax and the user may be prompted to choose (e.g., using a suitable user input mechanism) whether to include the instruction(s) in the workspace.

If the method 300 is implemented by the computational application 140, at block 330, the instruction(s) in the precise syntax are evaluated by the computational application 140. In one embodiment, the instruction(s) may be evaluated automatically after block 326 without any further user input. In another embodiment, a further user input (e.g., a key press, touch screen button press, etc.) is required to cause the instruction(s) to be evaluated.

FIGS. 5A-5E illustrate an example of entering NL input into a workspace of a computational application, and then including corresponding instructions in a precise format in the workspace, according to an embodiment. The example of FIGS. 5A-5E may correspond to method 300 of FIG. 4, and will be discussed with respect to FIG. 4 for ease of explanation. The example of FIGS. 5A-5E may correspond, however, to another suitable method. Moreover, the method 300 may utilize suitable workspace displays other than the example of FIGS. 5A-5E. The computational application 140 (FIG. 1) may cause the display information illustrated in FIGS. 5A-5E to be displayed on the display device 124, in an embodiment. The example of FIGS. 5A-5E is in the context of the MATHEMATICA® computational application. Similar workspace display information may be generated with other computational applications.

Figure 5A:
FIGS. 5A-5E illustrate an example of display information utilized when entering NL input into a workspace of a computational application, and then including corresponding instructions in a precise format in the workspace, according to an embodiment.

In FIG. 5A, a prompt 354 may indicate a location at which the user can enter an input into the workspace. The user may enter text after the prompt 354, and then press SHIFT-ENTER (i.e., press ENTER key while holding down the SHIFT key) to cause the computational application to process the user input, in an embodiment. Generally, the computational application may expect user input to be in a precise syntax. But when the user input is preceded by a special character or key press combination (e.g., CTRL-"=" or another suitable character or key press combination), the computational application treats the text 362 that follows the special character or key press combination as NL input (e.g., as in block 310 of FIG. 4). In the example of FIG. 5A, the user has pressed the "=" key while holding down the CTRL key (i.e., CTRL-"="), which results in the computational application displaying the symbol 358. After entering the text 362, and when the user presses SHIFT-ENTER, the computational application may generate an API call that includes the NL input 362 (e.g., as in block 314 of FIG. 4).

Figure 5B:
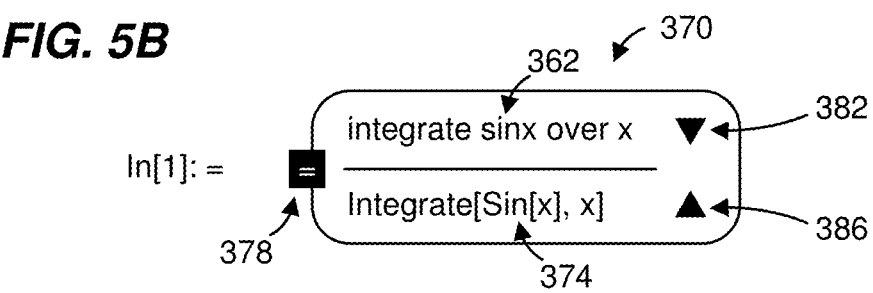

In response to the API call, the computational application may receive a result from the server system 112 that includes an instruction in a precise syntax that corresponds to the NL input 362. The computational application may then cause the text 362 to be replaced in the workspace by a display portion 370 (FIG. 5B). The display portion 370 may include the NL input 362. The display portion 370 may also include the instruction 374 in the precise syntax (e.g., as in block 326 of FIG. 4). The display portion 370 may also include a symbol 378 or other indicator to indicate that the portion 370 corresponds to interpretation of NL input. Additionally, in response to receiving the result, the computational application may evaluate the instruction 374 to generate an output, which is also displayed in the workspace (not shown).

As seen in FIG. 5B, the workspace displays both the NL input 362 and the corresponding instruction 374 (i.e., an "Integrate" function provided by MATHEMATICA® computational application). This may provide viewers of the workspace a natural language explanation of the instruction 374 in the precise syntax.

Figure 5C:
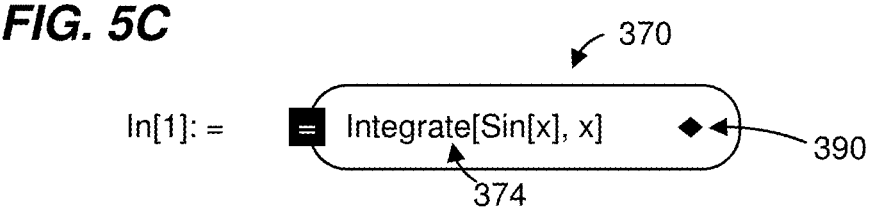

The display portion 370 may include a user interface mechanism 382 and a user interface mechanism 386. The user interface mechanism 382, when selected by the user, may cause the NL input to be hidden on the workspace. For instance, FIG. 5C illustrates the display portion 370 after the user has selected the user interface mechanism 382. As seen in FIG. 5C, the NL input 362 is now hidden. The display portion 370 may include a user interface mechanism 390 that, when selected, re-displays the NL input 362 and reverts the display portion 370 to the form illustrated in FIG. 5B.

As seen in FIG. 5C, the workspace displays the instruction 374 in the precise syntax but not the NL input 362 utilized to determine the instruction 374. This may be useful, for example, when the user does not want NL inputs displayed on the workspace, but wants an option to view the NL input later by selecting the user interface mechanism 390.

Figure 5D:
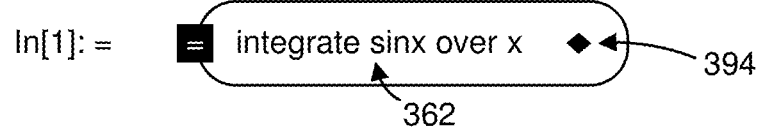

Referring now to FIG. 5B, when the user interface mechanism 386 is selected by the user, the instruction 374 is hidden on the workspace. For instance, FIG. 5D illustrates the display portion 370 after the user has selected the user interface mechanism 386. As seen in FIG. 5D, the instruction 374 is now hidden. The display portion 370 may include a user interface mechanism 394 that, when selected, re-displays the instruction 374 and reverts the display portion 370 to the form illustrated in FIG. 5B.

As seen in FIG. 5D, the workspace displays the NL input 362 utilized to determine the instruction 374 but not the instruction 374 itself. This may be useful, for example, when the user does not want instructions in a precise syntax displayed on the workspace, but wants an option to view the instruction 374 later by selecting the user interface mechanism 394.

Figure 5E:

Referring now to FIG. 5B, the user may also select the instruction 374 itself, e.g., by moving a cursor over the instruction 374 and selecting the instruction 374, touching a touch screen at a point over the instruction 374, etc. Then, only the instruction 374 will be displayed on the workspace. For instance, FIG. 5E illustrates the workspace after the user has selected the instruction 374. As seen in FIG. 5E, the NL input is now removed from the workspace.

As seen in FIG. 5E, the workspace displays the instruction 374 in the precise syntax but not the NL input 362 utilized to determine the instruction 374. This may be useful, for example, when the user does not want NL inputs displayed on the workspace, and does not want an option to view the NL input on the workspace at a later time.

Figure 6:
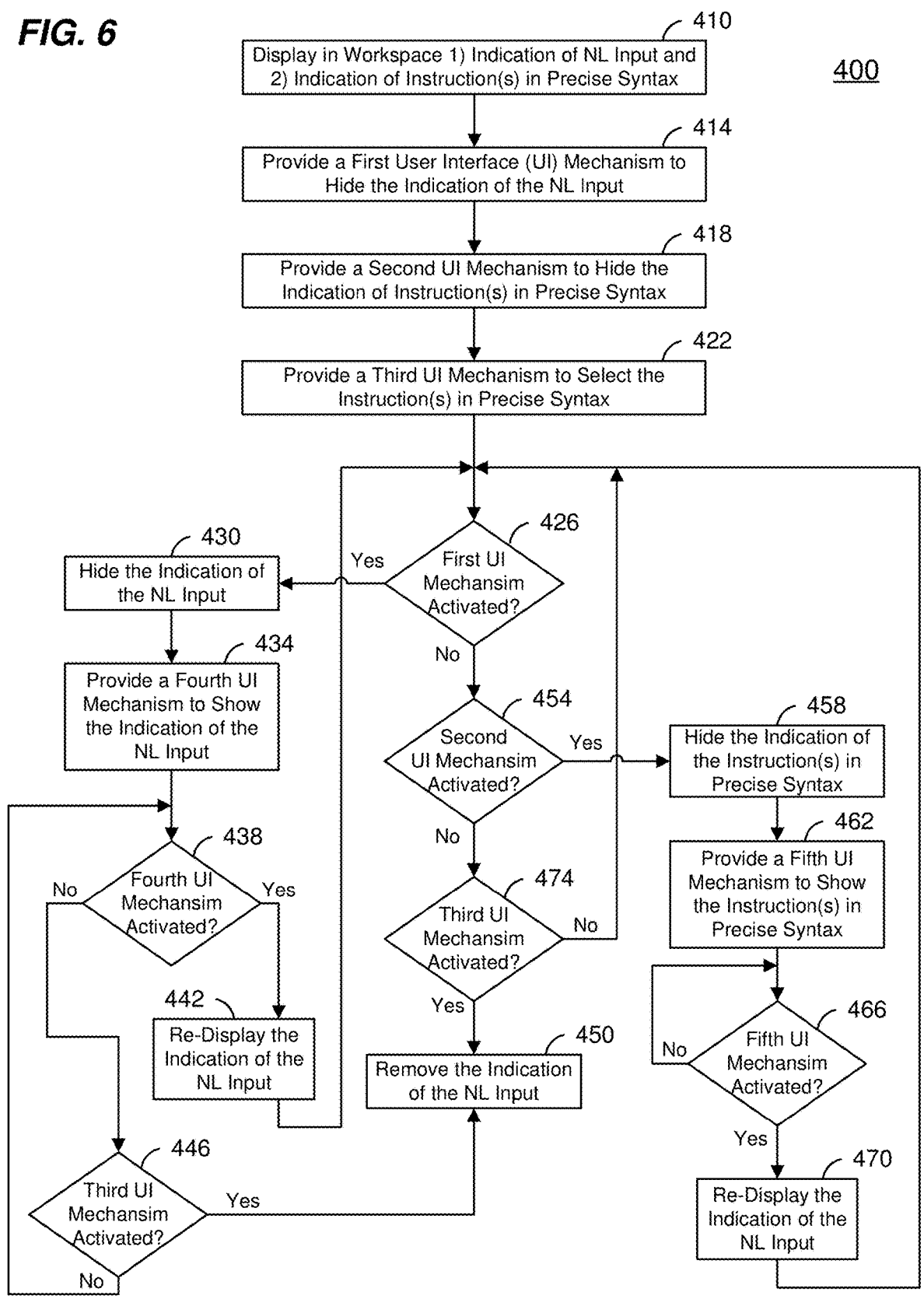
FIG. 6 is a flow diagram of an example method for including in a workspace NL input and instruction(s) in a precise context that correspond to the input, according to an embodiment.

FIG. 6 is a flow diagram of an example method 400 for including in a workspace NL input and instruction(s) in a precise context that correspond to the input, according to an embodiment. The workspace may be of a software development application or a computational application implemented by one or more processors, in an embodiment. The software development application 136 or the computational application 140, when executed by the one or more processors 116, may implement the method 400. The method 400 of FIG. 6 will be discussed with reference to FIGS. 5A-5E for ease of explanation, but the method 400 may be implemented with suitable display information other than display information such as depicted in FIGS. 5A-5E. The method 400 may be implemented upon receiving instruction(s) in a precise syntax that correspond to NL input.

At block 410, an indication of the NL input and an indication of the instruction(s) in the precise syntax may be displayed in a workspace of the software development application 136 or the computational application 140. For example, the display portion 370 of FIG. 5B may be displayed.

At block 414, a first user interface mechanism to hide the indication of the NL input may be provided. For example, the user interface mechanism 382 of FIG. 5B may be displayed in the workspace.

At block 418, a second user interface mechanism to hide the instruction(s) in the precise syntax may be provided. For example, the user interface mechanism 386 of FIG. 5B may be displayed in the workspace.

At block 422, a third user interface mechanism to select the instruction(s) in the precise syntax may be provided. In an embodiment, the indication of the instruction(s) in the precise syntax may be associated with or correspond to the third interface mechanism. For instance, an area of the display screen that overlaps with the indication of the instruction(s) in the precise syntax may correspond to the third user interface mechanism. When this area is selected by the user, the third user interface mechanism may be activated. For example, as discussed above with reference to FIG. 5B, a user can select the instruction(s) 374 by pressing a touch screen at a point over the instruction(s) 374, by moving a cursor over the instruction(s) 374 and activating a selection button, etc.

At block 426, it may be determined whether the first user interface mechanism was activated. For example, it may be determined whether the user selected the user interface mechanism 382 of FIG. 5B by a touch screen press, cursor selection, etc. If it is determined that the user activated the first user interface mechanism, the flow may proceed to block 430.

At block 430, the indication of the NL input may be hidden on the workspace. For example, as discussed with respect to FIG. 5C, the NL input 362 is hidden on the workspace. At block 434, a fourth user interface mechanism to re-show the indication of the NL input may be provided. For example, as shown in FIG. 5C, the user interface mechanism 390 is displayed in the workspace.

At block 438, it may be determined whether the fourth user interface mechanism was activated. For example, it may be determined whether the user selected the user interface mechanism 390 of FIG. 5C by a touch screen press, cursor selection, etc. If it is determined that the user activated the fourth user interface mechanism, the flow may proceed to block 442.

At block 442, the indication of the NL input may be re-shown in the workspace. For example, as discussed with respect to FIGS. 5B and 5C, the NL input 362 is re-shown on the workspace as in FIG. 5B when the user selects the user interface mechanism 390 of FIG. 5C.

On the other hand, if it is determined at block 438 that the user did not activate the fourth user interface mechanism, the flow may proceed to block 446. At block 446, it may be determined if the user selected the instruction(s) 374. For example, it may be determined whether the user selected the instruction(s) 374 by a touch screen press, cursor selection, etc. If it is determined that the user activated the third user interface mechanism, the flow may proceed to block 450.

At block 450, the NL input may be removed from the workspace. Additionally, the first user interface mechanism, the second user interface mechanism, and the third user interface mechanism may be removed from the workspace. For example, as discussed with respect to FIGS. 5B and 5E, the display of the workspace may appear as in FIG. 5E when the user selects the instruction(s) 374.

On the other hand, if it is determined at block 446 that the user did not activate the third user interface mechanism, the flow may return to block 438.

Referring again to block 426, if it is determined that the user did not activate the first user interface mechanism, the flow may proceed to block 454. At block 454, it may be determined whether the second user interface mechanism was activated. For example, it may be determined whether the user selected the user interface mechanism 386 of FIG. 5B by a touch screen press, cursor selection, etc. If it is determined that the user activated the second user interface mechanism, the flow may proceed to block 458.

At block 458, the indication of the instruction(s) in the precise syntax may be hidden on the workspace. For example, as discussed with respect to FIG. 5D, the instruction(s) 374 is hidden on the workspace. At block 462, a fifth user interface mechanism to re-show the instruction(s) in the precise syntax may be provided. For example, as shown in FIG. 5D, the user interface mechanism 394 is displayed in the workspace.

At block 466, it may be determined whether the fifth user interface mechanism was activated. For example, it may be determined whether the user selected the user interface mechanism 394 of FIG. 5D by a touch screen press, cursor selection, etc. If it is determined that the user activated the fifth user interface mechanism, the flow may proceed to block 470.

At block 470, the indication of the instruction(s) in the precise syntax may be re-shown in the workspace. For example, as discussed with respect to FIGS. 5B and 5D, the instruction(s) 374 is re-shown on the workspace as in FIG. 5B when the user selects the user interface mechanism 394 of FIG. 5D.

On the other hand, if it is determined at block 466 that the user did not activate the fifth user interface mechanism, the flow may return to block 466 to continue checking whether the user activated the fifth user interface mechanism.

Referring again to block 454, if it is determined that the user did not activate the second user interface mechanism, the flow may proceed to block 474. At block 474, it may be determined whether the third user interface mechanism was activated. For example, it may be determined whether the user selected the instruction(s) 374 of FIG. 5B or 5C by a touch screen press, cursor selection, etc. If it is determined that the user activated the third user interface mechanism, the flow may proceed to block 450. As discussed above, at block 450, the NL input may be removed from the workspace. Additionally, the first user interface mechanism, the second user interface mechanism, and the third user interface mechanism may be removed from the workspace. For example, as discussed with respect to FIGS. 5B and 5E, the display of the workspace may appear as in FIG. 5E when the user selects the instruction(s) 374.

Figure 7:
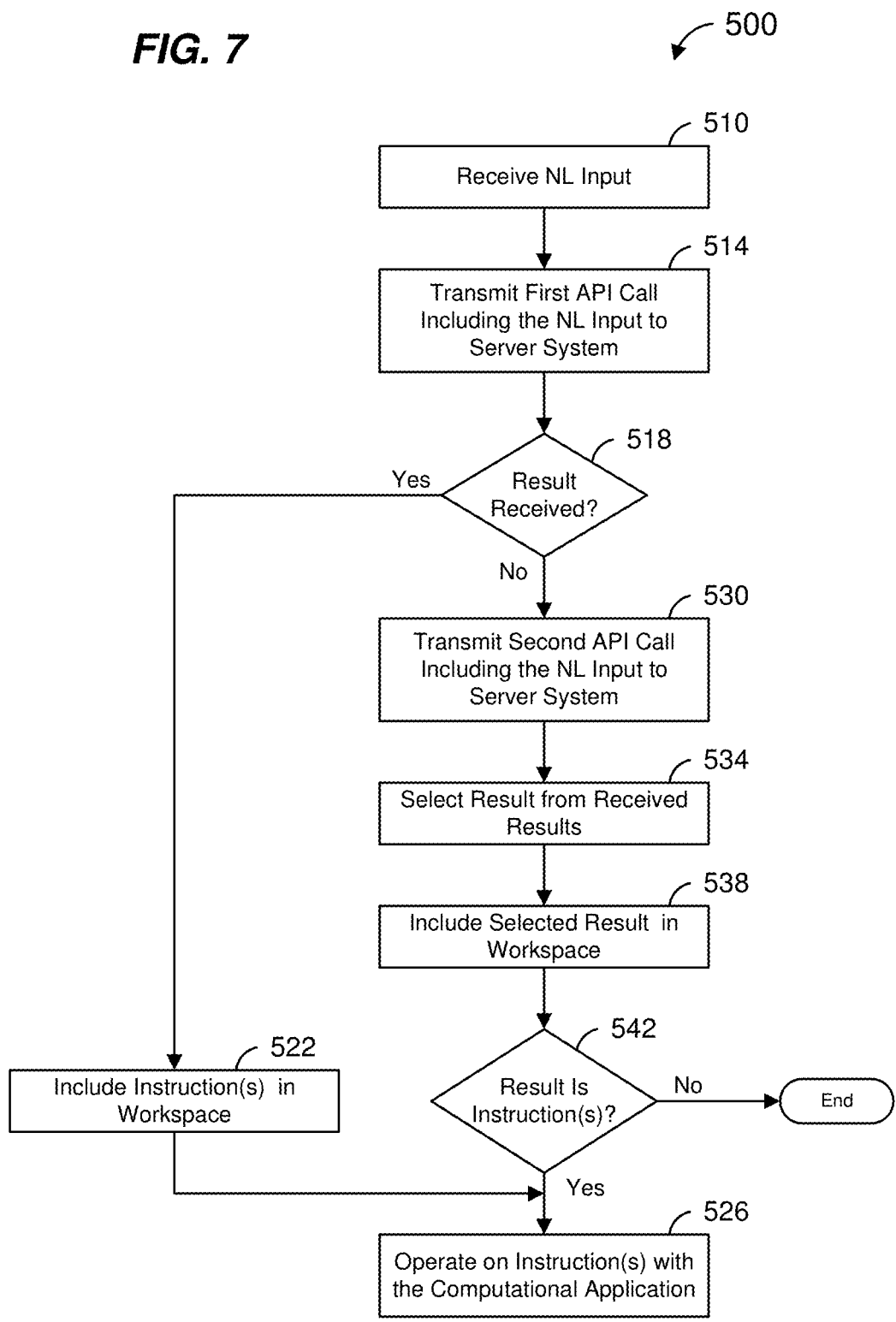
FIG. 7 is a flow diagram of another example method for assisting with the development of instruction(s) in a precise syntax in a system such as the system of FIG. 1, in an embodiment.

FIG. 7 is a flow diagram of an example method 500 for assisting with the development of instruction(s) in a precise syntax in a system such as the system 100 of FIG. 1 or in another suitable system, in an embodiment. For example, the software development application 136 or the computational application 140, when executed by the one or more processors 116, may implement the method 500. The method 500 of FIG. 7 will be discussed with reference to the system 100 of FIG. 1 for ease of explanation, but the method 500 may be implemented in a suitable system other than the system 100 of FIG. 1.

At block 510, NL input corresponding to instruction(s) in a precise syntax is electronically received. For example, as discussed above, the user may enter the NL input via a keyboard, a touch screen, a voice recognition system, etc., of the user computer 104. The NL input may then be electronically received by the software development application 136 or the computational application 140.

At block 514, a first API call that includes the NL input is generated and electronically transmitted to the server system 112. For example, the user computer 104 may generate the first API call that includes the NL input, and then electronically transmit the first API call via the network 108 to the server system 112. For instance, the software development application 136 or the computational application 140, when executed by the one or more processors 116, may generate the first API call and cause the first API call to be transmitted. In one embodiment, the first API call causes the server system 112 to implement the method 200 of FIG. 2. In other embodiments, the first API call causes the server system 112 to implement a suitable method other than the method 200 of FIG. 2.

At block 518, it may be determined if a result was received from the server system 112 in response to the first API call transmitted at block 514. If it is determined that a result (i.e., instruction(s) in the precise syntax) was received, the flow may proceed to block 522. At block 522, the instruction(s) in the precise syntax may be included in a workspace being utilized by the user for software development or development of instructions, commands, functions, formulas, etc., for processing by the computational application 140. In one embodiment, the instruction(s) in the precise syntax may be included in a workspace automatically without any further user input. In another embodiment, the user may be prompted (e.g., via the display device 124 and/or an audio output device of the user computer 104) whether to include the instruction(s) in the precise syntax in the workspace. For example, a window may display to the user the instruction(s) in the precise syntax and the user may be prompted to choose (e.g., using a suitable user input mechanism) whether to include the instruction(s) in the workspace.

If the method 500 is implemented by the computational application 140, at block 526, the instruction(s) in the precise syntax are evaluated by the computational application 140. In one embodiment, the instruction(s) may be evaluated automatically after block 526 without any further user input. In another embodiment, a further user input (e.g., a key press, touch screen button press, etc.) is required to cause the instruction(s) to be evaluated.

Referring again to block 518, if it is determined that a result was not received, the flow may proceed to block 530. For example, if a message from the server system 112 indicates that the server system 112 was not able to generate instruction(s) in a precise syntax in response to the first API call transmitted at block 514, the flow may proceed to block 530.

At block 530, a second API call that includes the NL input is generated and electronically transmitted to the server system 112. For example, the user computer 104 may generate the second API call that includes the NL input, and then electronically transmit the second API call via the network 108 to the server system 112. For instance, the software development application 136 or the computational application 140, when executed by the one or more processors 116, may generate the second API call and cause the second API call to be transmitted. In one embodiment, the second API call causes the server system 112 to implement the method 250 of FIG. 3. In other embodiments, the second API call causes the server system 112 to implement a suitable method other than the method 250 of FIG. 3.

At block 534, if multiple results are received in response to the second API call, one of the received results is selected. Various suitable techniques for selecting one of the received results may be utilized. Additionally, selecting one of the received results may be based on various factors. For example, if the received results include both instruction(s) in the precise syntax and other information that are not instructions in the precise syntax, one of the results including instruction(s) in the precise syntax may be selected. Additionally, a ranking applied to the server system 112 may be utilized to select one of the results. For example, a highest ranked result may be selected. Similarly, if the server system 112 marks one of the results as a primary result, the primary result may be selected. As another example, if the results are provided in an order, the first result in the order may be selected. Other suitable techniques and/or factors may also be utilized.

At block 538, the selected result may be included in the workspace. In one embodiment, the result may be included in a workspace automatically without any further user input. In another embodiment, the user may be prompted (e.g., via the display device 124 and/or an audio output device of the user computer 104) whether to include the result in the workspace. For example, a window may display to the user the result and the user may be prompted to choose (e.g., using a suitable user input mechanism) whether to include the result in the workspace.

At block 542, it may be determined if the result included in the workspace at block 538 includes instruction(s) in the precise syntax. If it is determined that the result includes instruction(s) in the precise syntax, the flow may proceed to block 526 at which the instruction(s) in the precise syntax are operated upon. On the other hand, if it is determined at block 542 that the result included in the workspace at block 538 does not include instruction(s) in the precise syntax, the flow may end.

FIGS. 8A and 8B illustrate an example of entering NL input into a workspace of a computational application, and then including corresponding instructions in a precise format in the workspace, according to an embodiment. The example of FIGS. 8A and 8B may correspond to the method 500 of FIG. 7, and will be discussed with respect to FIG. 7 for ease of explanation. The example of FIGS. 8A and 8B may correspond, however, to another suitable method. Moreover, the method 700 may utilize suitable workspace displays other than the example of FIGS. 8A and 8B. The computational application 140 (FIG. 1) may cause the display information illustrated in FIGS. 8A and 8B to be displayed on the display device 124, in an embodiment. The example of FIGS. 8A-8B is in the context of the MATHEMATICA® computational application. Similar workspace display information may be generated with other computational applications.

In FIG. 8A, a prompt 554 may indicate a location at which the user can enter an input into the workspace. The user may enter text after the prompt 554, and then press SHIFT-ENTER (i.e., press ENTER key while holding down the SHIFT key) to cause the computational application to process the user input, in an embodiment. Generally, the computational application may expect user input to be in a precise syntax. But when the user input is preceded by a special character or key press combination (e.g., "=" or another suitable character or key press combination), the computational application treats the text 558 that follows the special character or key press combination as NL input (e.g., as in block 510 of FIG. 7). In the example of FIG. 8A, the user has pressed the "=" key and then entered further text 558, which results in the computational application displaying the symbol 562. After entering the text 558, and when the user presses SHIFT-ENTER, the computational application may generate a first API call that includes the NL input 558 (e.g., as in block 514 of FIG. 7).

In response to the first API call, the computational application may receive a result from the server system 112 that includes an instruction in a precise syntax that corresponds to the NL input 558. The computational application may then cause the text 558 to be replaced in the workspace by a display portion 570 (FIG. 8B). The display portion 570 may include the NL input 558. The display portion 570 may also include the instruction 574 in the precise syntax (e.g., as in block 522 of FIG. 7). In FIG. 8B, the instruction in the precise syntax 574 is a "Mean" function provided by MATHEMATICA® computational application. Additionally, in response to receiving the result, the computational application may evaluate the instruction 574 to generate an output, which is also displayed in the workspace. In particular, an output 582 is displayed after a prompt 586, in an embodiment.

As seen in FIG. 8B, the workspace displays both the NL input 558 and the corresponding instruction 574. This may provide viewers of the workspace a natural language explanation of the instruction 574 in the precise syntax.

The display portion 570 may include a user interface mechanism 590. The user interface mechanism 590, when selected by the user, may permit a user to obtain information regarding the NL input 558 and/or the instruction 574. For example, the user interface mechanism 590, when selected by the user, may permit a user to obtain the instruction 574 in different formats, for example. Different formats may include, for example, a text format.

Figure 9A:
FIGS. 9A and 9B illustrate another example of display information utilized when entering NL input into a workspace of a computational application, and then including corresponding instructions in a precise format in the workspace, according to an embodiment.
Figure 9B:

If the server system 112 returns multiple results, the user interface mechanism 590 may be utilized to choose a different one of the results. For example, FIGS. 9A and 9B illustrate an example of entering NL input into a workspace of a computational application, and then including corresponding instructions in a precise format in the workspace, according to an embodiment. The example of FIGS. 9A and 9B may correspond to the method 500 of FIG. 7, and will be discussed with respect to FIG. 7 for ease of explanation. The example of FIGS. 9A and 9B may correspond, however, to another suitable method. Moreover, the method 700 may utilize suitable workspace displays other than the example of FIGS. 9A and 9B. The computational application 140 (FIG. 1) may cause the display information illustrated in FIGS. 9A and 9B to be displayed on the display device 124, in an embodiment. The example of FIGS. 9A-9B is in the context of the MATHEMATICA® computational application. Similar workspace display information may be generated with other computational applications.

In FIG. 9A, the user has entered the NL input 610. After entering the NL input 610, and when the user presses SHIFT-ENTER, the computational application may generate a first API call that includes the NL input 610 (e.g., as in block 514 of FIG. 7), in an embodiment.

In response to the first API call, the computational application may receive a message from the server system 112 that the server system 112 was unable to determine a single result (i.e., instruction(s) in the precise syntax) corresponding to the NL input 610. For example, the server system 112 may determine that there are multiple results.

In response to the message from the server system, the computational application may generate a second API call that includes the NL input 610 (e.g., as in block 530 of FIG. 7). In response to the second API call, the computational application may receive a result from the server system 112 that includes multiple results, wherein each of at least some of the results comprises instruction(s) in a precise syntax that corresponds to the NL input 610. The computational application may then select one of the results (as in block 534 of FIG. 7).

The computational application may then cause the text 610 to be replaced in the workspace by a display portion 620 (FIG. 9B). The display portion 620 may include the NL input 610. The display portion 620 may also include the instruction 624 in the precise syntax (e.g., as in block 538 of FIG. 7).

The display portion 620 may also include an indication 628 that other results were returned. Further, the display portion 620 may include a user interface mechanism 632. The user interface mechanism 632, when selected by the user, may permit a user to view and/or select other ones of the results returned in response to the second API call.

Additionally, in response to selecting one of the results and if the selected result is an instruction(s) in the precise syntax, the computational application may evaluate the instruction 624 to generate an output, which is also displayed in the workspace. In particular, an output 640 is displayed.

In some embodiments, NL input can be utilized for arguments, parameters, etc. within an instruction in a precise syntax (hereinafter referred to as "parameters" or "parameters of an instruction in a precise syntax" for brevity). For example, FIGS. 10A-10E illustrate an example of entering an instruction in a precise syntax into a workspace of a computational application, except that a parameter of the instruction is expressed using NL input (i.e., the parameter is not in the precise syntax), according to an embodiment. In response, the server system 112 may determine instruction(s) entirely in a precise syntax, according to an embodiment. The example of FIGS. 10A-10E may correspond to the method 300 of FIG. 4, and will be discussed with respect to FIG. 4 for ease of explanation. The example of FIGS. 10A-10E may correspond, however, to another suitable method. Moreover, the method 300 may utilize suitable workspace displays other than the example of FIGS. 10A-10E. The computational application 140 (FIG. 1) may cause the display information illustrated in FIGS. 10A-10E to be displayed on the display device 124, in an embodiment. The example of FIGS. 10A-10E is in the context of the MATHEMATICA® computational application. Similar workspace display information may be generated with other computational applications.

In the example of FIG. 10A, the user entered text 650 corresponding to an instruction in a precise syntax (i.e., the "Series" function provided by MATHEMATICA® computational application). In this example, the Series function is function that includes two arguments including a first argument which is an expression for which a power series approximation is desired. A second argument is a set of three sub-arguments $\{x, x_0, n\}$. The Series function determines a power series approximation of the expression (first argument) about the point $x=x_0$ to order at most $(x-x_0)^n$.

In the example of FIG. 10A, in place of the first argument of the Series function, the user has pressed the "=" key while holding down the CTRL key (i.e., CTRL-"="), which results in the computational application displaying the symbol 660. Next, the user has entered text 664 corresponding to a NL description of the first argument of the Series function. Next, the user enters a comma 668. The comma 668 may indicate an end of text corresponding to the first argument. Next, the user enters text 672 corresponding to the second argument of the Series function. The second argument has been entered in the precise syntax. Upon finishing entering text corresponding to the Series function, and the user presses SHIFT-ENTER and the computational application processes the user input.

The computational application may determine that the user input of FIG. 10A corresponds to the Series function in the precise syntax, except that the first parameter is expressed using NL. In response, the computational application may generate an API call that includes the NL input 664 (e.g., as in block 314 of FIG. 4).

In response to the API call, the computational application may receive a result from the server system 112 that includes the first argument in a precise syntax that corresponds to the NL input 664. The computational application may then cause the text 664 to be replaced in the workspace by a display portion 680 (FIG. 10B). The display portion 680 may include the NL input 664. The display portion 680 may also include the first argument in the precise syntax 684 (e.g., as in block 326 of FIG. 4). The display portion 680 may also include the symbol 660 or other indicator to indicate that the portion 680 corresponds to interpretation of NL input. Additionally, in response to receiving the response to the API call, the computational application may evaluate the Series function with the argument 684 to generate an output 686, which is also displayed in the workspace.

As seen in FIG. 10B, the workspace displays both the NL input 664 and the corresponding precise syntax argument 684 that corresponds to the NL input 664. This may provide viewers of the workspace a natural language explanation of the argument 684 in the precise syntax.

The display portion 680 may include a user interface mechanism 690 and a user interface mechanism 692. The user interface mechanism 690, when selected by the user, may cause the argument 684 in the precise syntax to be hidden on the workspace. For instance, FIG. 10C illustrates the display portion 680 after the user has selected the user interface mechanism 690. As seen in FIG. 10C, the argument 684 in the precise syntax is now hidden. The display portion 680 may include a user interface mechanism 694 that, when selected, re-displays the argument 684 in the precise syntax and reverts the display portion 680 to the form illustrated in FIG. 10B.

As seen in FIG. 10C, the workspace displays the first argument of the Series function as NL input, but not the argument 684 in the precise syntax. This may be useful, for example, when the user does not want the precise syntax displayed on the workspace, but wants an option to view the precise syntax later by selecting the user interface mechanism 694.

Referring now to FIG. 10B, when the user interface mechanism 692 is selected by the user, the NL input 664 is hidden on the workspace. For instance, FIG. 10D illustrates the display portion 680 after the user has selected the user interface mechanism 692. As seen in FIG. 10D, the argument 684 in the precise syntax is now hidden. The display portion 680 may include a user interface mechanism 696 that, when selected, re-displays the argument 684 in the precise syntax and reverts the display portion 680 to the form illustrated in FIG. 10B.

As seen in FIG. 10D, the workspace displays the argument 684 in the precise syntax but not the NL input 664. This may be useful, for example, when the user does not want NL input displayed on the workspace, but wants an option to view the NL input later by selecting the user interface mechanism 696.

Referring now to FIG. 10B, the user may also select the argument 684 in the precise syntax itself, e.g., by moving a cursor over the argument 684 in the precise syntax and selecting the argument 684 in the precise syntax, touching a touch screen at a point over the argument 684 in the precise syntax, etc. Then, only the argument 684 in the precise syntax will be displayed on the workspace. For instance, FIG. 10E illustrates the workspace after the user has selected the argument 684 in the precise syntax. As seen in FIG. 10E, the NL input 664 is now removed from the workspace.

As seen in FIG. 10E, the workspace displays the argument 684 in the precise syntax but not the NL input 664 utilized to determine the argument 684 in the precise syntax. This may be useful, for example, when the user does not want NL input displayed on the workspace, and does not want an option to view the NL input on the workspace at a later time.

A method similar to the method 400 of FIG. 6 may utilize display techniques such as described in FIGS. 10A-10E may be employed to for including in a workspace NL input and instruction(s) in a precise context that correspond to the input, according to an embodiment. The workspace may be of a software development application or a computational application implemented by one or more processors, in an embodiment. The software development application 136 or the computational application 140, when executed by the one or more processors 116, may implement such a method. Such a method may include determining that the user has entered text corresponding to an instruction in a precise syntax, except that one or more arguments of the instruction are entered using NL. In response to each argument determined to be entered as NL, the computational application may issue a respective API call to the server system and, in response, receive precise syntax corresponding to the argument. Then, the computational application may evaluate the instruction.

An argument entered using NL may include an instruction, and/or a known value. For example, an argument in NL could correspond to an instruction such as "derivative of sin x". Additionally, an argument in NL could correspond to a known value (i.e., known to the server system 112) such as "speed of light" or "population of France."

In some embodiments, the computational application and/or the software development application, when sending NL input to the server system 112 (e.g., via an API call), may include information regarding instruction(s) previously entered in the workspace, and/or results already included on the workspace, that may provide context for interpreting the NL input. For example, FIGS. 11A-11B illustrate an example in which information regarding instructions previously entered into a workspace, and/or results already included on the workspace, of a computational application are utilized for interpreting NL input.

The example of FIG. 11 may be utilized in connection with the method 500 of FIG. 7, and will be discussed with respect to FIG. 7 for ease of explanation. The example of FIG. 11 may correspond, however, to another suitable method such as the method 300 of FIG. 4. Moreover, the methods 300 and 700 may utilize suitable workspace displays other than the example of FIG. 11. The computational application 140 (FIG. 1) may cause the display information illustrated in FIG. 11 to be displayed on the display device 124, in an embodiment. The example of FIG. 11 is in the context of the MATHEMATICA® computational application. Similar workspace display information may be generated with other computational applications.

In the example of FIG. 11, the user entered NL text 710 corresponding to an instruction in a precise syntax (i.e., the "Show" function and the "Plot" function provided by MATHEMATICA® computational application). The computational application then sent a first API call that includes the NL input 710 (e.g., as in block 514 of FIG. 7) to the server system 112. In response to the first API call, the server system 112 may return an instruction 720 in a precise syntax. In particular, the server system 112 returns a "Show" function that includes as an argument a "Plot" function. The instruction 720 is then included in the workspace (e.g., as in block 522 of FIG. 7). Next, the computational application may evaluate the instruction 720 to generate an output 730 included on the workspace. The output 730 includes a plot of a sinusoid.

Optionally, if the instruction 720 is not returned in response to the first API call, the computational application may send a second API call that includes the NL input 710 (e.g., as in block 530 of FIG. 7) to the server system 112. In response to the second API call, the server system 112 may return a plurality of results, and the computational application may select the instruction 720 in a precise syntax from the results (e.g., as in block 534 of FIG. 7). The instruction 720 is then included in the workspace (e.g., as in block 538 of FIG. 7), and evaluated (as in block 526 of FIG. 7).

Next, the user entered NL text 740 corresponding to an instruction in a precise syntax (i.e., the "Show" function provided by MATHEMATICA® computational application). In particular, the NL text 740 corresponds to an instruction to add red dashed grid lines to the plot 730. The computational application then sent a first API call that includes the NL input 740 (e.g., as in block 514 of FIG. 7) to the server system 112. The first API call also includes information that indicates that a "Show" function and/or "Plot" function was previously entered in the workspace and/or that the last result generated by the computational application was a plot. In response to the first API call, the server system 112 may return an instruction 750 in a precise syntax. In particular, the server system 112 returns a "Show" function that includes as an argument the "%" symbol, which is precise syntax indicating the last result generated by the computational application (i.e., the plot 730). The instruction 750 is then included in the workspace (e.g., as in block 522 of FIG. 7). Next, the computational application may evaluate the instruction 750 to generate an output 760 included on the workspace. The output 760 corresponds to the plot 730 but with red dashed grid lines.

Optionally, if the instruction 740 is not returned in response to the first API call, the computational application may send a second API call that includes the NL input 740 (e.g., as in block 530 of FIG. 7) to the server system 112. The second API call also includes information that indicates that a "Show" function and/or "Plot" function was previously entered in the workspace and/or that the last result generated by the computational application was a plot. In response to the second API call, the server system 112 may return a plurality of results, and the computational application may select the instruction 750 in a precise syntax from the results (e.g., as in block 534 of FIG. 7). The instruction 750 is then included in the workspace (e.g., as in block 538 of FIG. 7), and evaluated (as in block 526 of FIG. 7).

Thus, the server system 112 (e.g., the software development assistance system 160, when executed by the one or more processors 144) may be configured to utilize information from the software development application 136 and/or the computational application 140 regarding instructions already entered into the workspace and/or results already included on the workspace, in some embodiments.

With regard to instructions related to plotting functions and/or data, the server system 112 (e.g., the software development assistance system 160, when executed by the one or more processors 144) may be configured to analyze NL input to determine a dimension of the plot (e.g., 2-dimensional or 3-dimensional) to be generated and to generate the instruction(s) in a precise context accordingly. In one embodiment, the server system 112 (e.g., the software development assistance system 160, when executed by the one or more processors 144) may be configured to analyze NL input to determine how many variables are to be plotted.

For instance FIG. 12A illustrates an example in which a user has entered NL input 810 that corresponds to generating a plot of several functions that are all a function of a variable x. The server system 112 analyzed the NL input 810 and determined that the NL input 810 corresponds to a "Plot" function provided by the MATHEMATICA® computational application, i.e., a function to create a 2-dimensional plot. The server system 112 generated the instruction 816 in the precise syntax, and the computational application evaluated the instruction 816 to generate a 2-dimensional plot 820.

On the other hand, FIG. 12B illustrates an example in which a user has entered NL input 830 that corresponds to generating a plot of a function of two variables x and y. The server system 112 analyzed the NL input 830 and determined that the NL input 830 corresponds to a "Plot3D" function provided by MATHEMATICA® computational application, i.e., a function to create a 3-dimensional plot of a function of two variables. The server system 112 generated the instruction 836 in the precise syntax, and the computational application evaluated the instruction 836 to generate a 3-dimensional plot 840.

The example of FIGS. 12A-12B is in the context of the MATHEMATICA® computational application. Similar workspace display information may be generated with other computational applications.

As seen in the examples of FIGS. 11, 12A and 12B, a computational application may permit generation of plots such as 2-dimensional and 3-dimensional plots. Using techniques such as described above, however, a user may be able to style such plots by entering less text, at least in some situations, and without necessarily knowing precise syntax normally required to perform such styling. For example, as illustrated in FIG. 11, a user may specify the line color of a curve (e.g., "dark brown") and shade areas "under" the curve with a desired color (e.g., "light orange") merely by entering the NL input "plot sin x in dark brown with light orange filling." The server system 112 may determine precise syntax 720 necessary to perform such styling, e.g., "Show [PlotSin[x], . . . PlotStyle->Darker[Brown], { . . . FillingStyle->Lighter[Orange] }]]". Similarly, a user can add red dashed grid lines to the plot merely by entering the NL input "add red dashed grid lines." The server system 112 may determine precise syntax 760 necessary to perform such styling, e.g., "Show[%, . . . GridLinesStyle->Directive[Red, Dashed]]".

Similarly, other styling can be applied using a NL input. For example, if a user desires a particular line thickness (e.g., 3 point thickness) of a plot, the user may enter the NL input "set line thickness 3". The server system 112 may determine precise syntax necessary to perform such styling, e.g., "MapAt[{AbsoluteThickness[3], #1} &, %, 1]". As a further example, if a user desires to change the background to a particular color (e.g., light yellow mixed with light gray) of a plot, the user may enter the NL input "change background to light yellow+light gray". The server system 112 may determine precise syntax necessary to perform such styling, e.g., "Show[%, Background->RGBColor [0.8333333333333333, 0.8333333333333333, 0.5]". As yet another example, if a user desires to add a frame with tick marks to a plot, the user may enter the NL input "add frame". The server system 112 may determine precise syntax necessary to perform such styling, e.g., "Show[%, Frame->True]".

In some embodiments, techniques such as described above can be utilized to perform image processing functions. For example, if image data has been included in the workspace, and if a user desires to apply an "oil painting" effect, the user may enter the NL input "oil painting". The server system 112 may determine precise syntax necessary to perform such image processing on the image date in the workspace, e.g., "ImageEffect[%, "OilPainting"]". Similarly, if image data has been included in the workspace, and if a user desires to apply a "solarization" effect, the user may enter the NL input "solarization effect". The server system 112 may determine precise syntax necessary to perform such image processing on the image date in the workspace, e.g., "ImageEffect[%, "Solarization"]". Similarly, if image data has been included in the workspace, and if a user desires to apply an "embossing" effect, the user may enter the NL input "emboss image". The server system 112 may determine precise syntax necessary to perform such image processing on the image date in the workspace, e.g., "ImageEffect[%, "Embossing"]".

Although a key press (e.g., "=") or a combination of key presses (e.g., CTRL-"=") were described above as techniques for indicating NL input, other suitable techniques may be utilized. For example, a pull-down menu, a pop-up menu, a button press, a touch screen action (e.g., a swipe, a circular motion, a swipe pattern, press-and-hold, etc.) may be utilized to indicate text is NL input. As a specific example, a user may select a menu item corresponding to a request to enter NL input. In response to the selection, a window may open to prompt a user to enter text into a text box, for example. Then, the user may press ENTER, SHIFT-ENTER, press a button, etc., to indicate that the user is finished entering the NL input.

Although techniques above were described in the context of a computational application and/or the MATHEMATICA® computational application, similar techniques can be utilized with the software development application 136 (FIG. 1). For example, a method similar to the method 300 of FIG. 4 may be implemented by the software development application 136. For instance, instruction(s) in a precise syntax may be included in a workspace corresponding to a source code file. The block 330 may be omitted or modified so that the instruction(s) in precise syntax is/are processed by the software development application 136. In one embodiment, the software development application 136 may be configured to include the NL input utilized to determine the instruction(s) in precise syntax in the workspace as comments.

As another example, a method similar to the method 500 of FIG. 7 may be implemented by the software development application 136. For instance, instruction(s) in a precise syntax may be included in a workspace corresponding to a source code file. The block 526 may be omitted or modified so that the instruction(s) in precise syntax is/are processed by the software development application 136. In one embodiment, the software development application 136 may be configured to include the NL input utilized to determine the instruction(s) in precise syntax in the workspace as comments. The user may be prompted visually, audibly, etc., to include the NL input as comments, and the user may press a button, etc., to cause the NL input to be included as comments.

Referring again to FIG. 1, the server system 112 may utilize systems and techniques in U.S. patent application Ser. No. 11/852,044, filed on Sep. 7, 2007, and/or in U.S. patent application Ser. No. 12/780,685, filed on May 14, 2010, which are hereby incorporated by reference herein in their entireties. For instance, in an embodiment, the server system 112 may implement a system the same as or similar to the systems described. For example, the server system 112 may implement one or more scanners including a scanner configured to instructions in a precise syntax (e.g., instructions that adhere to a precise syntax of a software programming language or instructions that adhere to a precise syntax utilized by a computational application (e.g., the instructions correspond to built-in functions of the computational application)). In one embodiment, the scanner is configured to generate one or more sets of instruction(s) in precise syntax corresponding to an NL input.

In an embodiment, the server system 112 may be configured to determine one or more sets of instruction(s) in the precise syntax that correspond to the NL input. For example, there might be multiple interpretations of the NL input, and the multiple sets of instruction(s) in the precise syntax may correspond to the multiple interpretations. If multiple sets of instruction(s) in the precise syntax are determined, the multiple sets may be evaluated the multiple sets to eliminate sets and/or rank sets. For example, sets may be evaluated for code size, memory use efficiency, code readability metrics, simplicity, etc. Also, sets that result in unwanted operations such as a "divide-by-zero", an infinite loop, etc., may be eliminated. If the server system 112 is configured to implement a method such as the method 200 of FIG. 2, and if multiple sets of instruction(s) in the precise syntax are determined, at most one set may be selected for transmission to the user computer. If the server system 112 is configured to implement a method such as the method 250 of FIG. 3, and if multiple sets of instruction(s) in the precise syntax are determined, multiple sets may be transmitted to the user computer. Additionally, if the server system 112 is configured to implement a method such as the method 250 of FIG. 3, results generated from other types of scanners such as described in U.S. patent application Ser. No. 11/852,044, filed on Sep. 7, 2007, and/or in U.S. patent application Ser. No. 12/780,685, filed on May 14, 2010, may be transmitted to the user computer.

Figure 13:
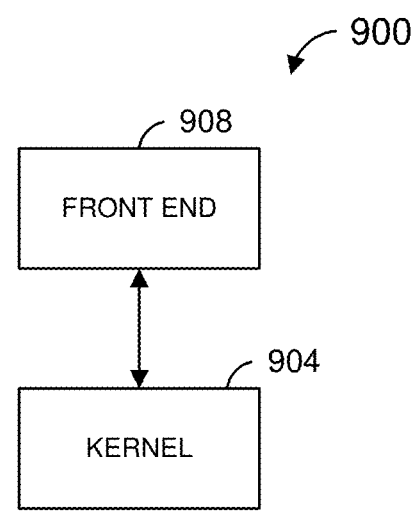
FIG. 13 is a block diagram of an example computational system with which at least some of the methods and techniques described herein may be implemented, in an embodiment.

FIG. 13 is a block diagram of an example computational system 900 with which at least some of the methods and techniques described above may be implemented, in an embodiment. For example, the computational system 900 may implement a computational application such as described above. The system 900 comprises a kernel 904 in data communication with a front end 908. In general, the kernel 904 may comprise software components that, when executed by one or more processors of a computer system, perform computations such as numeric computations, symbolic computations, graphic computations, etc. The front end 908 may comprise software components that, when executed by one or more processors of a computer system, handle interaction with a user. For example, the front end 908 may be configured to permit the user to enter expressions to be evaluated by the kernel 904, to permit a user to initiate evaluations of expressions, to display results of evaluations to the user, etc.

The kernel 904 and the front end 908 may be implemented on a same computing system or on different computing systems that are communicatively coupled to one another. For example, referring to FIG. 1, the kernel 904 and the front end 908 may be implemented by the user computer 104 (e.g., the computational application 140 may comprise the kernel 904 and the front end 908). As another example, the front end 908 may be implemented by the user computer 104, whereas the kernel 904 may be implemented by the server system 112 or another suitable server system. Thus, the kernel 904 and the front end 908 may communicate via a communication link that comprises one or more of procedure calls, messages, a proprietary application programming interface (API) (e.g., the API provided by MATH-LINK® software available from Wolfram Research, Inc.), etc. Additionally, if the kernel 904 and the front end 908 are implemented on different computing systems, the kernel 904 and the front end 908 may communicate via the network 108 and/or another suitable network or communication link.

The front end 908 may include an interactive document referred to as a notebook similar to those often used with MATHEMATICA® computational system. A notebook may include input to be sent to the kernel 904 and output received from the kernel 904, as well as text, graphics, palettes, etc. A notebook may include menus and graphical tools for creating and reading notebook documents and for sending information to and receiving information from the kernel 904. The notebook may be utilized as a workspace in which NL input and/or instruction(s) in a precise syntax are included, such as described above. The precise syntax may be the syntax specified by the MATHEMATICA® computational system, in an embodiment.

The method 300 may be implemented by a system such as the system 900. For example, blocks 310, 314, 318, 322 and 326 may be implemented by the front end 908, and block 330 may be implemented by the kernel 904, in an embodiment. In other embodiments, the blocks of the method 300 may be implemented by the system 900 in other suitable ways. Similarly, the method 500 may be implemented by a system such as the system 900. For example, blocks 510, 514, 518, 522, 530, 534, 538, and 542 may be implemented by the front end 908, and blocks 522 and 526 may be implemented by the kernel 904, in an embodiment. In other embodiments, the blocks of the method 500 may be implemented by the system 900 in other suitable ways. Similarly, the method 400 may be implemented by the front end 908.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a programmable logic device (PLD) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time.

For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" or the phrase "in an embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computational application system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for identifying terminal road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
   receiving, via a user interface device, user input for inclusion in a workspace document within a graphical user interface of a software development application that, when executed by one or more computer processors, is configured to evaluate instructions in a precise syntax;
   after receiving the user input, displaying, on a display device, the user input in the workspace document;
   determining, at the one or more computer processors, whether at least a portion of the user input i) is in the precise syntax, or ii) is in an imprecise syntax;
   in response to determining that at least the portion of the user input is in the precise syntax, evaluating, at the one or more computer processors, at least the portion of the user input according to the precise syntax;
   in response to determining that at least the portion of the user input is in the imprecise syntax, generating, at the one or more computer processors, an application programming interface (API) call that includes i) the at least the portion of the user input in the imprecise syntax, and ii) other information within the workspace document that provide context for a natural language processing (NLP) system, implemented by the one or more computer processors or one or more other computer processors, to interpret the at least the portion of the user input in the imprecise syntax, wherein the API call is configured to:
   prompt the NLP system to process the at least the portion of the user input in the imprecise syntax and the other information within the workspace document in the API call to determine an instruction in the precise syntax that corresponds to the user input in the imprecise syntax, and to format the instruction in the precise syntax according to a format recognized by the software development application, wherein the instruction in the precise syntax is for generating a modification of a result of a previous evaluation;
   sending, by the one or more computer processors, the API call to the NLP system,
   receiving, at the one or more computer processors, the instruction in the precise syntax from the NLP system, wherein receiving the instruction in the precise syntax from the NLP system is responsive to sending the API call to the NLP system, and
   including, by the one or more computer processors, the instruction in the precise syntax in the workspace document such that the software development application executed by the one or more computer processors can evaluate the instruction in the precise syntax.

2. The method of claim 1, wherein determining whether the at least a portion of the user input i) is in the precise syntax, or ii) is in the imprecise syntax, includes:
   analyzing the user input to determine if the user input includes a user indication, in the precise syntax, that indicates whether the at least the portion of the user input i) is in the precise syntax, or ii) is in the imprecise syntax.

3. The method of claim 1, wherein:
   the user input is first user input;
   the instruction in the precise syntax is a first instruction in the precise syntax;
   the method further comprises:
   receiving, via the user interface device, second user input for inclusion in the workspace document, the second user input including a second instruction in the precise syntax, after receiving the second user input, displaying, on the display device, the second user input in the workspace document, and
   after including the second instruction in the precise syntax in the workspace document, evaluating, at one or more computing devices, the second instruction in the precise syntax;
   the first user input indicates an argument of the second instruction;
   the first instruction is included in the workspace document such that the first instruction is included in the workspace document as the argument of the second instruction; and
   evaluating the second instruction in the precise syntax comprises evaluating the first instruction as the argument of the second instruction.

4. The method of claim 1, further comprising:
   displaying, on the display device, a display portion at a location in the workspace document at which at least the portion of the user input in the imprecise syntax was displayed prior to determining the instruction in the precise syntax;
   wherein the display portion simultaneously includes at least the portion of the user input in the imprecise syntax and the instruction in the precise syntax.

5. The method of claim 1, wherein:
   sending the API call to the NLP system comprises sending the API call to the NLP system via a communication network; and
   receiving the instruction in the precise syntax from the NLP system comprises receiving the instruction in the precise syntax from the NLP system via the communication network.

6. The method of claim 1, wherein:
   the other information within the workspace document that provides context for the NLP system to interpret the at least the portion of the user input in the imprecise syntax comprises one or more other instructions in the precise syntax.

7. One or more tangible, non-transitory computer readable storage media, storing machine readable instructions that, when executed by one or more computer processors, cause the one or more computer processors to:

receive, via a user interface device, user input for inclusion in a workspace document within a graphical user interface of a software development application that, when executed by the one or more computer processors, is configured to evaluate instructions in a precise syntax;

after receiving the user input, display, on a display device, the user input in the workspace document;

determine whether at least a portion of the user input i) is in the precise syntax, or ii) is in an imprecise syntax;

in response to determining that at least the portion of the user input is in the precise syntax, evaluate at least the portion of the user input according to the precise syntax;

in response to determining that at least the portion of the user input is in the imprecise syntax, generate an application programming interface (API) call that includes i) the at least the portion of the user input in the imprecise syntax, and ii) other information within the workspace document that provide context for a natural language processing (NLP) system, implemented by the one or more computer processors or one or more other computer processors, to interpret the at least the portion of the user input in the imprecise syntax, wherein the API call is configured to:
prompt the NLP system to process the at least the portion of the user input in the imprecise syntax and the other information within the workspace document in the API call to determine an instruction in the precise syntax that corresponds to the user input in the imprecise syntax, and to format the instruction in the precise syntax according to a format recognized by the software development application, wherein the instruction in the precise syntax is for generating a modification of a result of a previous evaluation;

send the API call to the NLP system, receive the instruction in the precise syntax from the NLP system, wherein receiving the instruction in the precise syntax from the NLP system is responsive to sending the API call to the NLP system, and include the instruction in the precise syntax in the workspace document such that the software development application executed by the one or more computer processors can evaluate the instruction in the precise syntax.

8. The one or more tangible, non-transitory computer readable storage media of claim 7, further storing machine readable instructions that, when executed by the one or more computer processors, cause the one or more computer processors to:
determine whether the at least a portion of the user input i) is in the precise syntax, or ii) is in the imprecise syntax, at least by analyzing the user input to determine if the user input includes a user indication, in the precise syntax, that indicates whether the at least the portion of the user input i) is in the precise syntax, or ii) is in the imprecise syntax.

9. The one or more tangible, non-transitory computer readable storage media of claim 7, wherein:
the user input is first user input;
the instruction in the precise syntax is a first instruction in the precise syntax;
the one or more tangible, non-transitory computer readable storage media further store machine readable instructions that, when executed by the one or more computer processors, cause the one or more computer processors to:

receive, via the user interface device, second user input for inclusion in the workspace document, the second user input including a second instruction in the precise syntax, after receiving the second user input, display, on the display device, the second user input in the workspace document, and in connection with including the second instruction in the precise syntax in the workspace document, evaluate the second instruction in the precise syntax;

the first user input indicates an argument of the second instruction;

the first instruction is included in the workspace document such that the first instruction is included in the workspace document as the argument of the second instruction; and evaluating the second instruction in the precise syntax comprises evaluating the first instruction as the argument of the second instruction.

10. The one or more tangible, non-transitory computer readable storage media of claim 7, further storing machine readable instructions that, when executed by the one or more computer processors, cause the one or more computer processors to:
display a display portion at a location in the workspace document at which at least the portion of the user input in the imprecise syntax was displayed prior to determining the instruction in the precise syntax;
wherein the display portion simultaneously includes at least the portion of the user input in the imprecise syntax and the instruction in the precise syntax.

11. The one or more tangible, non-transitory computer readable storage media of claim 7, further storing machine readable instructions that, when executed by the one or more computer processors, cause the one or more computer processors to:
send the API call to the NLP system via a communication network; and
receive the instruction in the precise syntax from the NLP system via the communication network.

12. The one or more tangible, non-transitory computer readable storage media of claim 7, wherein:
the other information within the workspace document that provides context for the NLP system to interpret the at least the portion of the user input in the imprecise syntax comprises one or more other instructions in the precise syntax.

13. A system, comprising:
one or more computer processors;
one or more tangible, non-transitory computer readable storage media storing machine readable instructions that, when executed by the one or more computer processors, cause the one or more computer processors to:
receive, via a user interface device, user input for inclusion in a workspace document within a graphical user interface of a software development application that, when executed by the one or more computer processors, is configured to evaluate instructions in a precise syntax, after receiving the user input, display, on a display device, the user input in the workspace document, determine whether at least a portion of the user input i) is in the precise syntax, or
ii) is in an imprecise syntax, and
in response to determining that at least the portion of the user input is in the precise syntax, evaluate at least the portion of the user input according to the precise syntax;

wherein the one or more tangible, non-transitory computer readable storage media further store machine readable instructions that, when executed by the one or more computer processors, cause the one or more processors to:
in response to determining that at least the portion of the user input is in the imprecise syntax,
generate an application programming interface (API) call that includes i) the at least the portion of the user input in the imprecise syntax, and ii) other information within the workspace document that provide context for a natural language processing (NLP) system, implemented by the one or more computer processors or one or more other computer processors, to interpret the at least the portion of the user input in the imprecise syntax, wherein the API call is configured to:
prompt the NLP system to process the at least the portion of the user input in the imprecise syntax and the other information within the workspace document in the API call to determine an instruction in the precise syntax that corresponds to the user input in the imprecise syntax, and to format the instruction in the precise syntax according to a format recognized by the software development application, wherein the instruction in the precise syntax is for generating a modification of a result of a previous evaluation;
send the API call to the NLP system, receive the instruction in the precise syntax from the NLP system, wherein receiving the instruction in the precise syntax from the NLP system is responsive to sending the API call to the NLP system, and
include the instruction in the precise syntax in the workspace document such that the software development application executed by the one or more computer processors can evaluate the instruction in the precise syntax.

14. The system of claim 13, wherein the one or more tangible, non-transitory computer readable storage media further store machine readable instructions that, when executed by the one or more computer processors, cause the one or more computer processors to:
determine whether the at least a portion of the user input i) is in the precise syntax, or ii) is in the imprecise syntax, at least by analyzing the user input to determine if the user input includes a user indication, in the precise syntax, that indicates whether the at least the portion of the user input i) is in the precise syntax, or ii) is in the imprecise syntax.

15. The system of claim 13, wherein:
the user input is first user input;
the instruction in the precise syntax is a first instruction in the precise syntax;
the one or more tangible, non-transitory computer readable storage media further store machine readable instructions that, when executed by the one or more computer processors, cause the one or more computer processors to:

receive, via the user interface device, second user input for inclusion in the workspace document, the second user input including a second instruction in the precise syntax, after receiving the second user input, display, on the display device, the second user input in the workspace document, and in connection with including the second instruction in the precise syntax in the workspace document, evaluate the second instruction in the precise syntax;
the first user input indicates an argument of the second instruction;
the first instruction is included in the workspace document such that the first instruction is included in the workspace document as the argument of the second instruction; and
evaluating the second instruction in the precise syntax comprises evaluating the first instruction as the argument of the second instruction.

16. The system of claim 13, wherein the one or more tangible, non-transitory computer readable storage media further store machine readable instructions that, when executed by the one or more computer processors, cause the one or more computer processors to:
display a display portion at a location in the workspace document at which at least the portion of the user input in the imprecise syntax was displayed prior to determining the instruction in the precise syntax;
wherein the display portion simultaneously includes at least the portion of the user input in the imprecise syntax and the instruction in the precise syntax.

17. The system of claim 13, further comprising:
a network interface device coupled to a communication network;
wherein the one or more tangible, non-transitory computer readable storage media further store machine readable instructions that, when executed by the one or more computer processors, cause the one or more computer processors to:
send the API call to the NLP system via the network interface device and the communication network; and
receive the instruction in the precise syntax from the NLP system via the communication network and the network interface device.

18. The system of claim 13, wherein:
the other information within the workspace document that provides context for the NLP system to interpret the at least the portion of the user input in the imprecise syntax comprises one or more other instructions in the precise syntax.

19. The system of claim 13, further comprising:
the display device.

20. The system of claim 19, further comprising:
the user interface device.

21. The system of claim 13, further comprising:
the NLP system implemented by the one or more computer processors or one or more other computer processors.

* * * * *